US012688757B2

(12) United States Patent
Corvese

(10) Patent No.: US 12,688,757 B2
(45) Date of Patent: Jul. 21, 2026

(54) LOTTERY TICKET VENDING MACHINE

(71) Applicant: Brightstar Global Solutions Corporation, Providence, RI (US)

(72) Inventor: Robert Corvese, Warwick, RI (US)

(73) Assignee: Brightstar Global Solutions Corporation, Providence, RI (US)

( * ) Notice: Subject to any disclaimer, the term of this patent is extended or adjusted under 35 U.S.C. 154(b) by 267 days.

(21) Appl. No.: 18/503,652

(22) Filed: Nov. 7, 2023

(65) Prior Publication Data

US 2025/0148875 A1 May 8, 2025

(51) Int. Cl.
*G07F 17/32* (2006.01)
*G07F 11/42* (2006.01)
*G07F 11/72* (2006.01)

(52) U.S. Cl.
CPC ............ *G07F 17/329* (2013.01); *G07F 11/42* (2013.01); *G07F 11/72* (2013.01)

(58) Field of Classification Search
CPC ......... G07F 17/329; G07F 17/42; G07F 17/72
See application file for complete search history.

(56) References Cited

U.S. PATENT DOCUMENTS 3,855,457 A 12/1974 Amundson et al.
4,350,264 A 9/1982 Muller
4,982,337 A 1/1991 Burr et al.
5,222,624 A 6/1993 Burr
5,268,561 A 12/1993 Kimura et al.
5,272,321 A 12/1993 Otsuka et al.
5,408,417 A 4/1995 Wilder
5,611,456 A 3/1997 Kasper
5,836,498 A 11/1998 Turek
6,095,624 A 8/2000 Wilbert
6,206,263 B1 3/2001 Rich et al.
6,609,644 B1 8/2003 Menna
6,637,634 B1 10/2003 Yeo et al.
6,712,253 B2 3/2004 Hargrave et al.
6,714,838 B2 3/2004 Scrymgeour et al.
(Continued)

FOREIGN PATENT DOCUMENTS

CA 2379687 C 11/2005
CN 217443917 U 9/2022
(Continued)

OTHER PUBLICATIONS

European Extended Search Report, from corresponding European Patent Application No. 24208056.2, Apr. 10, 2025.

*Primary Examiner* — Robert E Mosser
(74) *Attorney, Agent, or Firm* — Neal, Gerber & Eisenberg LLP

(57) ABSTRACT

A lottery ticket vending machine including a housing, a ticket drawer column in the housing, the ticket drawer column including a plurality of ticket drawers, each of the ticket drawers configured to hold one or more packs of lottery tickets, and a ticket burster in the housing, the ticket burster defining a ticket inlet and a ticket outlet, the ticket burster movable to a plurality of different ticket receipt positions, each different ticket receipt position associated with and in alignment with a different one of the ticket drawers, the ticket burster including, in various embodiments, one or more or all of a ticket pack sensor, a ticket exit sensor, a barcode sensor, and a ticket drawer sensor.

10 Claims, 13 Drawing Sheets

(56) References Cited

U.S. PATENT DOCUMENTS

| | | | |
|---|---|---|---|
| 6,726,077 | B2 | 4/2004 | Roberts et al. |
| 6,886,728 | B2 | 5/2005 | Roberts et al. |
| 6,994,230 | B2 | 2/2006 | Sams |
| 7,032,774 | B2 | 4/2006 | Boehm et al. |
| 7,383,099 | B2 | 6/2008 | Pollard et al. |
| 7,562,798 | B2 | 7/2009 | Bartolone et al. |
| 7,665,394 | B2 | 2/2010 | Roberts et al. |
| 7,850,257 | B2 | 12/2010 | Roberts et al. |
| 8,127,973 | B2 | 3/2012 | Mirkovic et al. |
| 8,192,268 | B1 | 6/2012 | Karpe |
| 8,210,921 | B1 | 7/2012 | Karpe |
| 8,534,524 | B2 | 9/2013 | Businger et al. |
| 8,550,294 | B2 | 10/2013 | Martin |
| 9,613,337 | B1 | 4/2017 | Garrison |
| 9,685,026 | B1 | 6/2017 | Garrison |
| 10,438,452 | B2 | 10/2019 | Ferron et al. |
| 11,010,987 | B2 | 5/2021 | Bucci |
| 11,062,547 | B2 * | 7/2021 | Adelberg ................ G07F 11/62 |
| 12,080,132 | B2 | 9/2024 | Topalian et al. |
| 2001/0049986 | A1 | 12/2001 | Roberts et al. |
| 2003/0120381 | A1 | 6/2003 | Perin et al. |
| 2003/0204288 | A1 | 10/2003 | Scrymgeour et al. |
| 2004/0000572 | A1 | 1/2004 | Engelhardt, Jr. et al. |
| 2004/0254008 | A1 | 12/2004 | Anderson et al. |
| 2005/0178810 | A1 | 8/2005 | Woods et al. |
| 2006/0173576 | A1 | 8/2006 | Goerg et al. |
| 2007/0017978 | A1 | 1/2007 | Ho |
| 2007/0088459 | A1 | 4/2007 | Pollard et al. |
| 2007/0172106 | A1 | 7/2007 | Paraskevakos |
| 2008/0290127 | A1 | 11/2008 | Bartolone et al. |
| 2010/0308071 | A1 | 12/2010 | Businger |
| 2011/0042403 | A1 | 2/2011 | Martin |
| 2012/0085777 | A1 | 4/2012 | Bucci et al. |
| 2014/0008407 | A1 | 1/2014 | Bucci et al. |
| 2014/0046481 | A1 | 2/2014 | Siciliano et al. |
| 2014/0117614 | A1 | 5/2014 | Kallin et al. |
| 2014/0263619 | A1 | 9/2014 | Turocy et al. |
| 2014/0353375 | A1 | 12/2014 | Turocy et al. |
| 2015/0066207 | A1 | 3/2015 | Erb |
| 2016/0232741 | A1 | 8/2016 | Assis et al. |
| 2017/0004671 | A1 | 1/2017 | Connolly et al. |
| 2018/0108203 | A1 | 4/2018 | Li et al. |
| 2018/0186557 | A1 | 7/2018 | Ghia et al. |
| 2018/0186558 | A1 | 7/2018 | Mejenborg et al. |
| 2020/0023265 | A1 | 1/2020 | Kennedy |
| 2022/0108562 | A1 | 4/2022 | Claude et al. |
| 2022/0114842 | A1 | 4/2022 | Mejenborg et al. |
| 2022/0114860 | A1 | 4/2022 | Mejenborg et al. |
| 2023/0084907 | A1 | 3/2023 | Gonzalez et al. |
| 2024/0021054 | A1 | 1/2024 | Topalian et al. |
| 2025/0118127 | A1 | 4/2025 | Thoeni et al. |
| 2025/0166445 | A1 | 5/2025 | Topalian et al. |

FOREIGN PATENT DOCUMENTS

| | | | |
|---|---|---|---|
| IT | 20090162 | A1 | 3/2011 |
| JP | H11306413 | A | 11/1999 |
| KR | 0139213 | Y1 | 4/1999 |
| KR | 0175637 | B1 | 4/1999 |
| KR | 101727651 | B1 | 4/2017 |
| WO | 2004099915 | A2 | 11/2004 |

* cited by examiner

LOTTERY TICKET VENDING MACHINE

BACKGROUND

The present disclosure relates to lottery ticket vending machines.

Lottery tickets such as instant lottery tickets may be printed on a strip that may be rolled or fan-folded and provided as a pack of lottery tickets. Lottery tickets in such strips may be separated along perforations formed between adjacent tickets in the strips. Lottery tickets may vary in width and length. Lottery tickets may be sold from such packs using lottery ticket vending machines.

BRIEF SUMMARY

In various embodiments, the present disclosure relates to a lottery ticket vending machine including: a housing; a ticket drawer column in the housing, the ticket drawer column including a plurality of ticket drawers, each of the ticket drawers configured to hold one or more packs of lottery tickets; and a ticket burster in the housing, the ticket burster defining a ticket inlet and a ticket outlet, the ticket burster movable to a plurality of different ticket receipt positions, each different ticket receipt position associated with and in alignment with a separate one of the ticket drawers, the ticket burster including a ticket pack sensor, a ticket exit sensor, a barcode sensor, and a ticket drawer sensor.

In various other embodiments, the present disclosure relates to a lottery ticket vending machine including: a housing; a ticket drawer column in the housing, the ticket drawer column including a plurality of ticket drawers, each of the ticket drawers configured to hold one or more packs of lottery tickets, each ticket drawer including a reflector; and a ticket burster in the housing, the ticket burster defining a ticket inlet and a ticket outlet, the ticket burster movable to a plurality of different ticket receipt positions, each different ticket receipt position associated with and in alignment with a separate one of the ticket drawers, the ticket burster including a ticket drawer sensor, wherein for each ticket drawer, the ticket drawer sensor is configured to sense the reflector of that ticket drawer when the ticket burster is aligned with that ticket drawer.

In various embodiments, the present disclosure relates to a lottery ticket vending machine including: a housing; a lottery ticket drawer supported by the housing; a ticket burster supported by the housing, the ticket burster defining a ticket inlet and a ticket outlet, the ticket burster including a ticket pack sensor, a ticket exit sensor, a barcode sensor, and a ticket drawer sensor; and a controller supported by the housing, the controller configured to receive data from the ticket pack sensor, the ticket exit sensor, the barcode sensor, and the ticket drawer sensor, the controller configured to, based on the data, determine a state of the ticket drawer and to cause an action to be taken responsive to determining the state of the ticket drawer.

Additional features are described in, and will be apparent from, the following Detailed Description and the figures.

DETAILED DESCRIPTION

Figure 1:
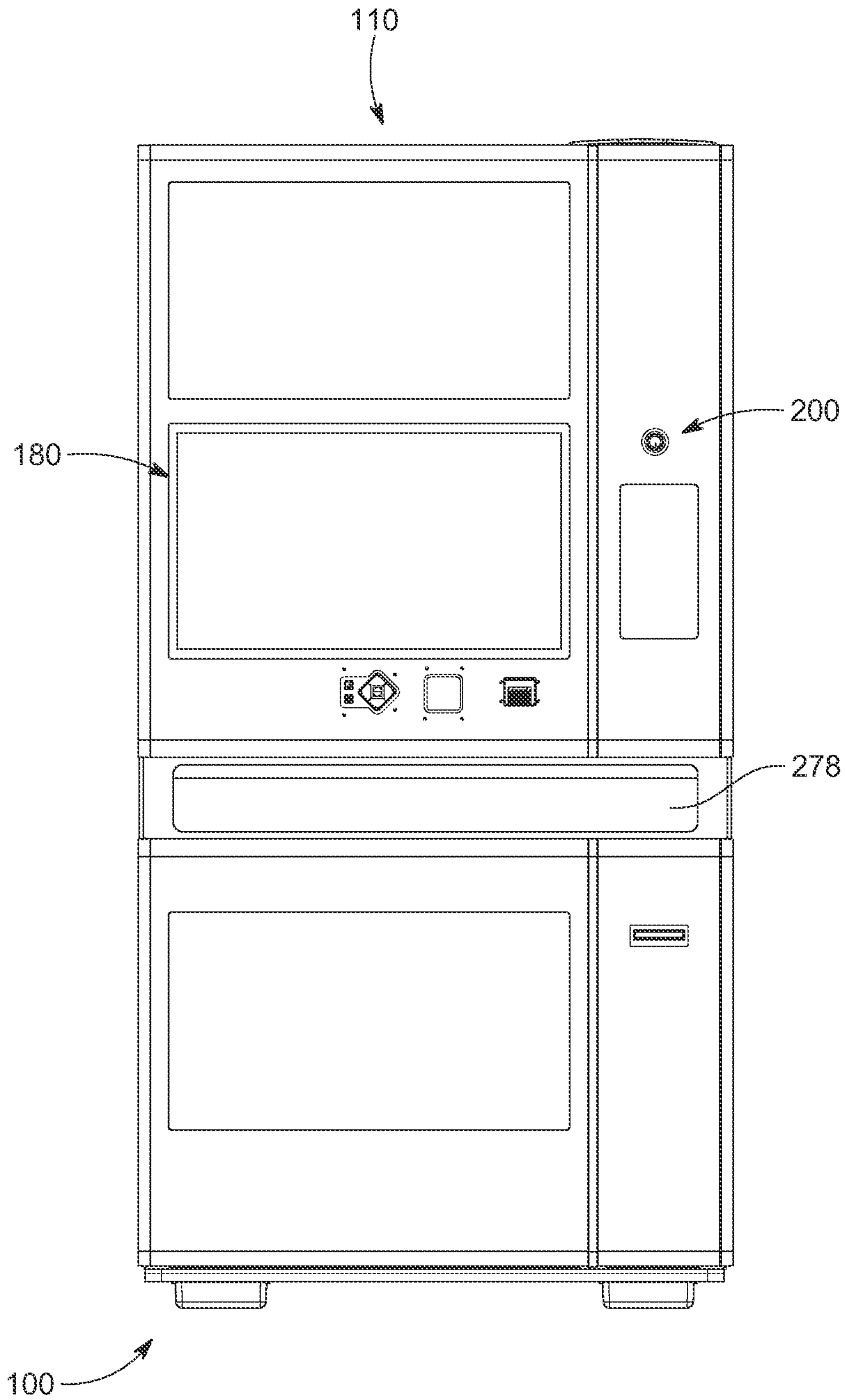
FIG. 1 is a front perspective view of a lottery ticket vending machine of one example embodiment of the present disclosure shown with a front door thereof in a closed position.

In various example embodiments, the present disclosure relates to a lottery ticket vending machine including one or more ticket bursters that each include multiple different sensors configured to detect lottery tickets in ticket drawers and the presence of ticket drawers in a ticket drawer column. In various such embodiments, the lottery ticket vending machine is configured to determine if multiple packs of lottery tickets (such as connected by tape) are in any of the ticket drawers of the lottery ticket vending machine. In various such embodiments, the lottery ticket vending machine is configured to take suitable actions and/or provide and display suitable information regarding the detected ticket drawers, detected lottery tickets in the ticket drawers, and detected multiple packs of lottery tickets in the ticket drawers.

In various example embodiments, each of the ticket bursters of the lottery ticket vending machine includes: (1) a ticket pack sensor configured to detect multiple packs of lottery tickets in a ticket drawer; (2) a ticket exit sensor configured to sense a lottery ticket in a ticket drawer in a ticket exit position; (3) a barcode sensor configured to obtain bar code data of the lottery tickets from a ticket drawer to enable the controller(s) of the lottery ticket vending machine to determine if multiple packs are in a ticket drawer; and (4) a ticket drawer sensor configured to obtain data regarding the presence of the ticket drawers in a ticket drawer column.

In various embodiments, the lottery ticket vending machine includes one or more controllers configured to receive data from these sensors, and analyze and use the data received from these sensors to make such determinations regarding any actions to be taken and information to be displayed (including but not limited to any alerts to be created, transmitted, and displayed based on such determinations regarding the ticket drawers and the lottery tickets in the ticket drawers).

In various embodiments, the lottery ticket vending machine is configured to display one or more indications regarding the ticket drawers and the lottery tickets in each of the ticket drawers of the lottery ticket vending machine.

For a better understanding of the present disclosure, example instant lottery tickets are first generally described herein.

Various known instant lottery tickets are single game instant lottery tickets. An example single game instant lottery ticket can include: (1) a ticket substrate having a front surface and a back surface; (2) a predefined scratch-off area on the front surface; (3) variable lottery game indicia printed on the predefined scratch-off area; (4) a scratch-off coating ("SOC") covering the variable lottery game indicia and the predefined scratch-off area; and (5) variable instant lottery ticket information indicia printed on the back surface. The instant lottery ticket information indicia can include text, one or more ticket numbers, one or more ticket codes (such as barcodes), and other instant lottery ticket information that is in human readable and machine readable forms. Certain of this instant lottery ticket information: (a) identifies the instant lottery ticket; (b) the set, run, and/or pack of instant lottery tickets that the instant lottery ticket is part of; and (c) other inventory control information. Various known single game instant lottery tickets include multiple predefined scratch-off areas, multiple sets of variable lottery game indicia printed on the predefined scratch-off areas, and multiple SOCs covering the variable lottery game indicia sets. Instant lottery tickets can also be of the known pull tab type. Various known instant lottery tickets are multi-game instant lottery tickets and can be larger than single game instant lottery tickets. Various known instant lottery tickets have a width that varies from 2 to 4 inches and a length that varies from 2 to 12 inches. The term lottery ticket as used herein is intended to cover these various different types and other types of lottery tickets that can be dispensed in a same or similar manner as these types of lottery tickets.

Various lottery tickets are often arranged after manufacture (which includes after complete printing) in lottery ticket packs for storage, organization, sorting, picking, shipping to lottery ticket distributors or lottery ticket retailers, and activation. An instant lottery ticket pack can include a plurality of lottery tickets that are all of the same type, same size, and for the same game. Each instant lottery ticket pack can be protected for storage and shipping by a transparent pack wrapping, such as transparent plastic wrapping, securely wrapped around the plurality of lottery tickets. A pack of instant lottery tickets can include all of the instant lottery tickets attached to each other but joined by perforations. Such lottery tickets of a pack can be detached from each other along such perforations. While the lottery tickets of each pack are often manufactured in a continuous strip that is fan-folded for convenient supply, the packs can be in other forms such as in a roll form. These packs in the fan-folded form or in the roll form are configured for dispensing via a lottery ticket vending machine.

In various situations, adjacent lottery tickets can be connected by tape. One situation occurs when two lottery tickets of a single pack are separated, and an operator reconnects such lottery tickets of that single pack using a strip of tape. In this situation, the tape is thus used to fix a broken pack. Another situation occurs when two packs of the lottery tickets for the same lottery game are connected together by an operator using a strip of tape. In this situation, the tape is used to connect the trailing ticket of one pack to the leading ticket of another pack. Another situation occurs when two packs of the lottery tickets for different lottery games are connected together by an operator using a strip of tape. In this situation, the tape is used to connect the trailing ticket of one pack to the leading ticket of another pack. Thus, in such example situations, the packs and thus the lottery tickets connected by the tape can be lottery tickets for the same game or for different lottery games. Such pack or packs can be placed in a ticket drawer. In certain instances, when an operator connects two packs (whether or the same lottery game, or for different lottery games) the operator does not make a suitable input regarding the multiple packs and the lottery ticket vending machine thus does not know (based on the operator inputs) that two packs are in a ticket drawer. This can create issues in correctly dispensing and tracking such dispensed lottery tickets requested by players. The present disclosure in part addresses such situations.

Figure 10:
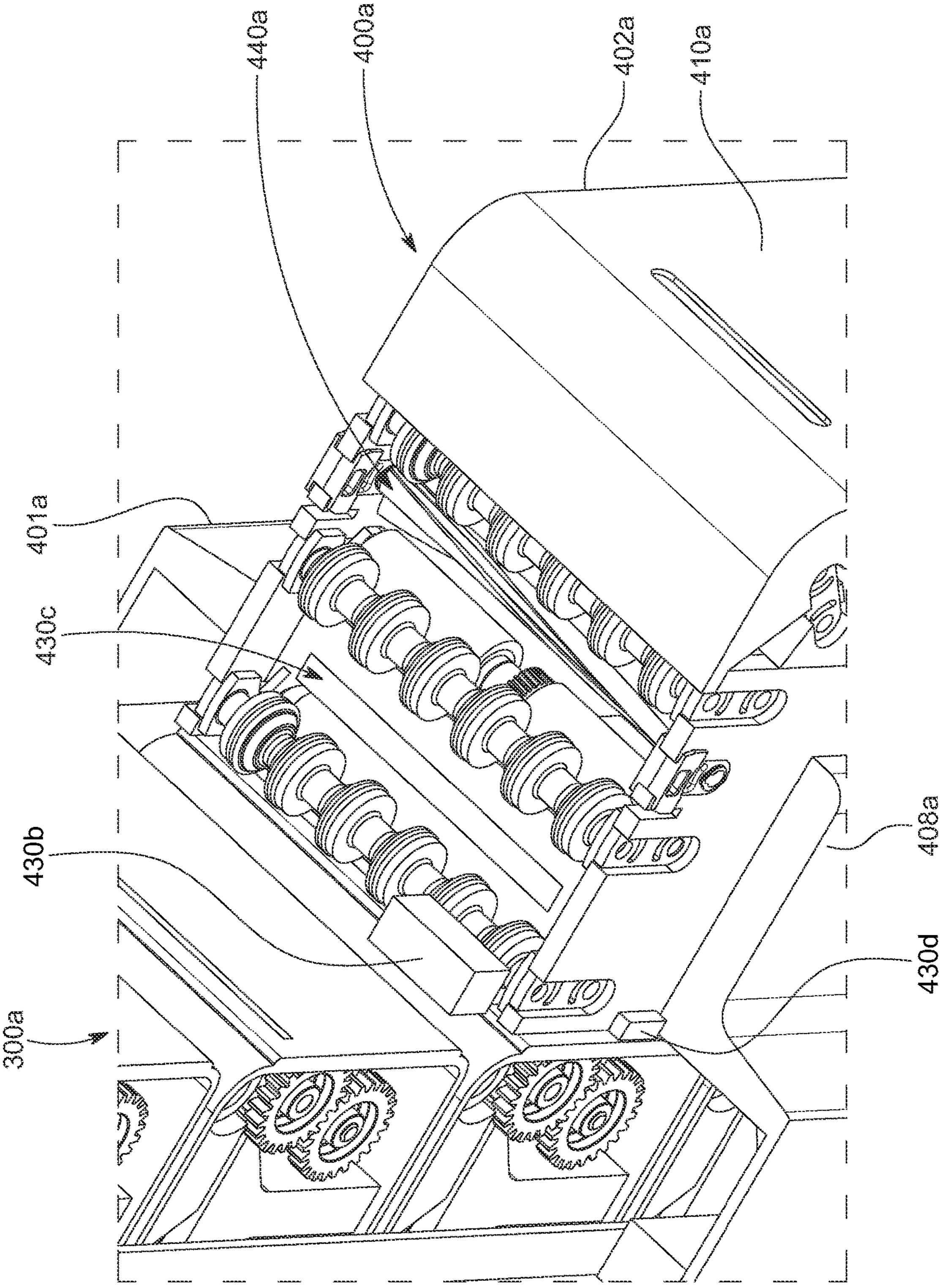
FIG. 10 is a further enlarged perspective view of part of the ticket drawer column of FIG. 4, and the burster of FIG. 5 aligned with one of the ticket drawers of the ticket drawer column.
Figure 11:
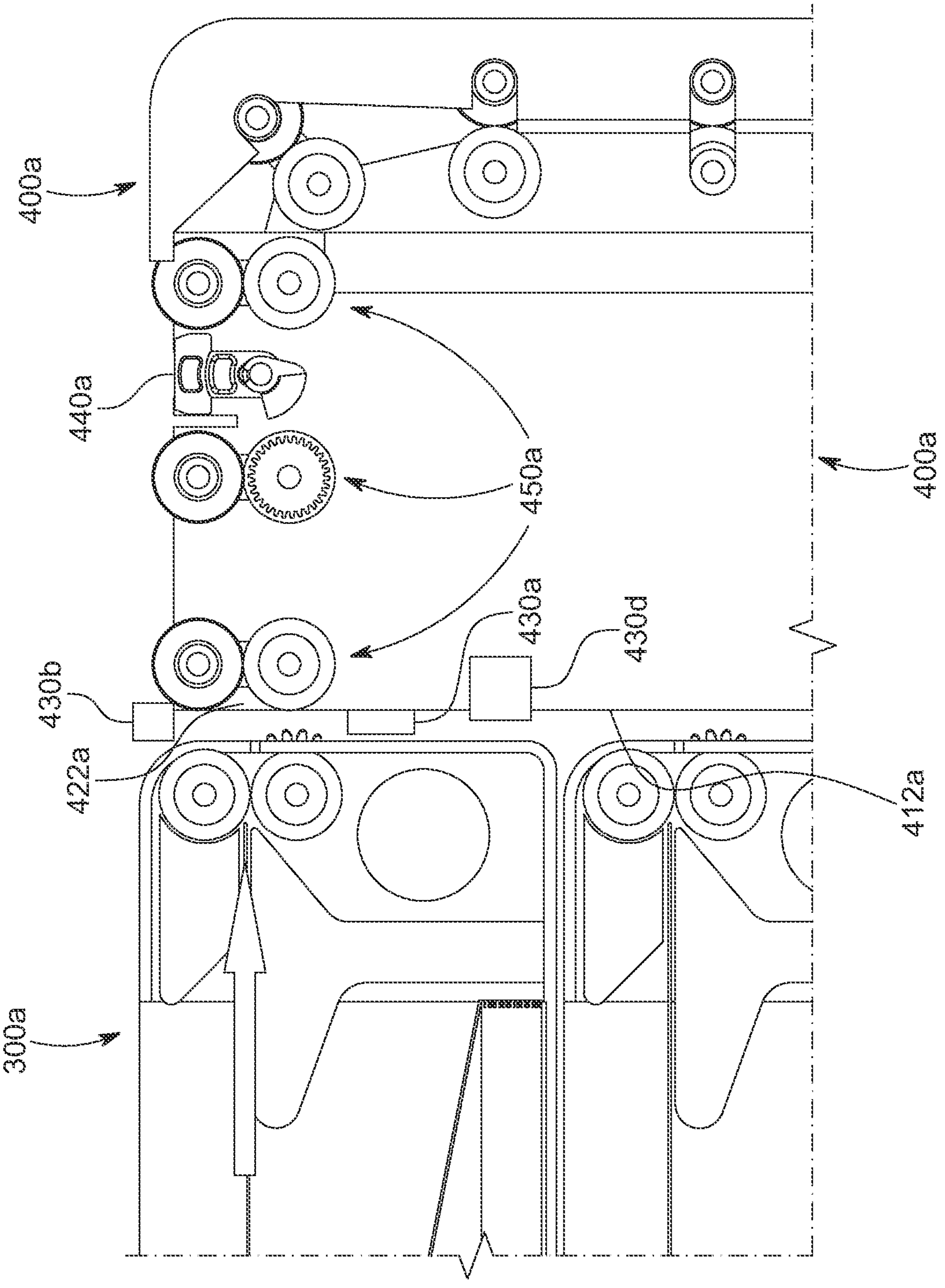
FIG. 11 is an enlarged side view of part of the ticket drawer column of FIG. 4, and the burster of FIG. 5 aligned with one of the ticket drawers of the ticket drawer column.
Figure 12:
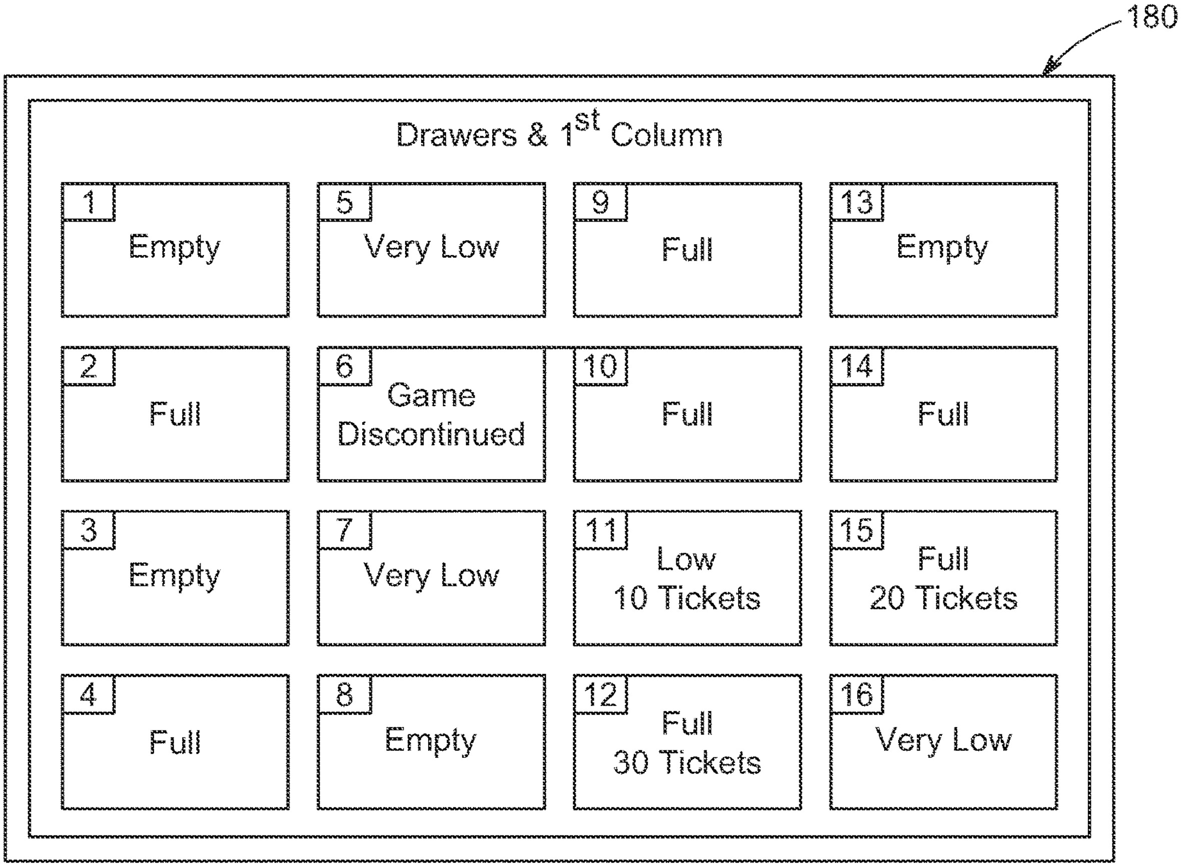
FIG. 12 illustrates an example interface displayable by a display device of the lottery ticket vending machine of FIG. 1, and providing a lottery ticket state indicator.

FIGS. 1 to 12 illustrate a lottery ticket vending machine 100 of one example embodiment of the present disclosure. The lottery ticket vending machine 100 may be referred to herein as the "ticket vending machine" or the "vending machine" for brevity. FIG. 12 illustrates an example interface displayable by a display device of the lottery ticket vending machine 100 and configured to display lottery ticket state indicators for each of the lottery ticket drawers such as described below.

The illustrated example ticket vending machine 100 includes: (a) a machine housing 110 including a front door 200; (b) three ticket drawer columns 300*a*, 300*b*, and 300*c* positioned in and supported by the machine housing 110; and (c) three separate and independently movable ticket bursters 400*a*, 400*b*, and 400*c* positioned in the machine housing 110 and supported by burster supports (not labeled) positioned in and supported by the machine housing 110. Bursting of the lottery ticket is the industry term for separating a lottery ticket from a pack of lottery tickets held in a ticket drawer. In the example embodiments described herein, the ticket drawers of the ticket drawer columns do not burst the lottery tickets and do not need any mechanisms for bursting the lottery tickets, but rather each of the moveable ticket bursters bursts the lottery tickets moved into that ticket burster as further explained below. The front door 200 includes a ticket collection receptacle 250 configured to receive separated lottery tickets from each of the ticket bursters 400*a*, 400*b*, and 400*c*. The quantity, positions, sizes, and configurations of the ticket drawer columns, ticket drawers, and the ticket bursters can vary in accordance with the present disclosure.

It should be appreciated that the ticket vending machine 100 includes various other components that are conventional in the industry and/or that would be readily apparent to those of ordinary skill in the art. For example, the ticket vending machine 100 can include: (1) various electronic components (not shown) some of which can be contained in an electronic component holder (not labeled) positioned in and supported by the machine housing 110; and (2) various purchaser interface components (not labeled) that are part of the front door 200 of the machine housing 110. These components are only briefly described herein for brevity. Such electronic components can be arranged in any suitable manner. The electronic component holder can be in the form of a slide-out drawer to facilitate access to the various electronic components contained therein. The electronic components can form part of the control system for the ticket vending machine 100. Various electronic components can also be positioned in the machine housing 110 outside of the electrical component holder. The electronic components can include one or more controllers that control the operation of the ticket vending machine 100 including the movable ticket bursters 400*a*, 400*b*, and 400*c* as further discussed herein to facilitate the determination of tickets in the ticket drawers and the dispensing of each requested lottery ticket from those ticket drawers. The controller(s) can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) store(s) instructions executable by the processing device(s) to control operation of the ticket vending machine 100. The purchaser interface components include one or more display devices (such as display device 180), one or more input devices, and one or more payment acceptors. The purchaser interface components enable purchasers to use such components to determine the lottery tickets available from the ticket vending machine 100, and to select and pay for any of those lottery tickets held by the ticket vending machine 100 that the purchaser desires to obtain. The purchaser interface components can display images and information to inform purchasers of the different lottery tickets available from the ticket vending machine 100 and to assist in completing the selection and purchase of such lottery tickets. These electronic components and purchaser interface components can take many different forms as well known in the industry, and are thus not described in detail herein for brevity.

Figure 2:
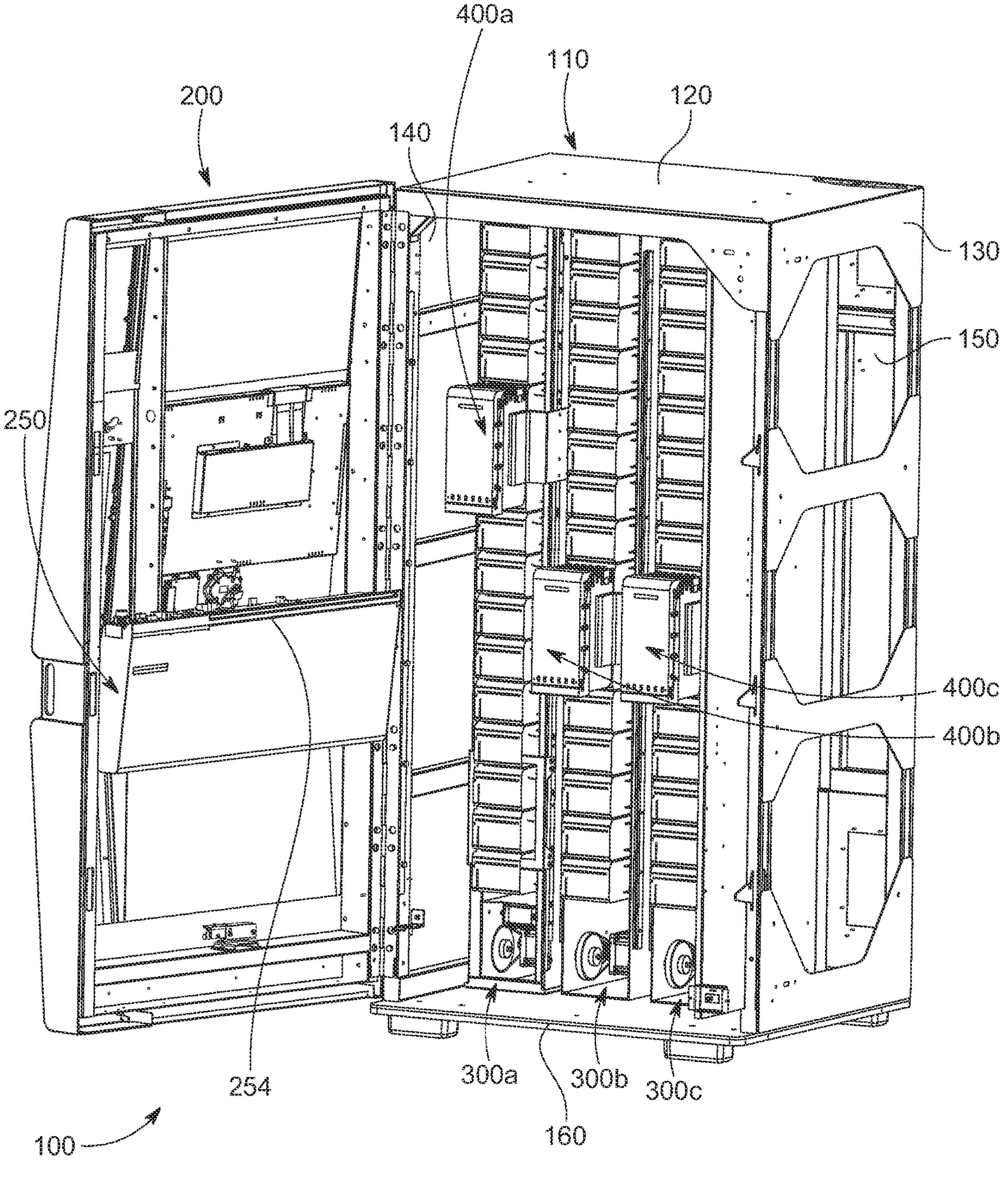
FIG. 2 is a front perspective view of the lottery ticket vending machine of FIG. 1 shown with the front door thereof in an open position, shown with a left side wall panel thereof removed, showing three ticket drawer columns and three movable ticket bursters respectively associated the three ticket drawer columns, and showing a ticket collection receptacle of the front door.
Figure 3:
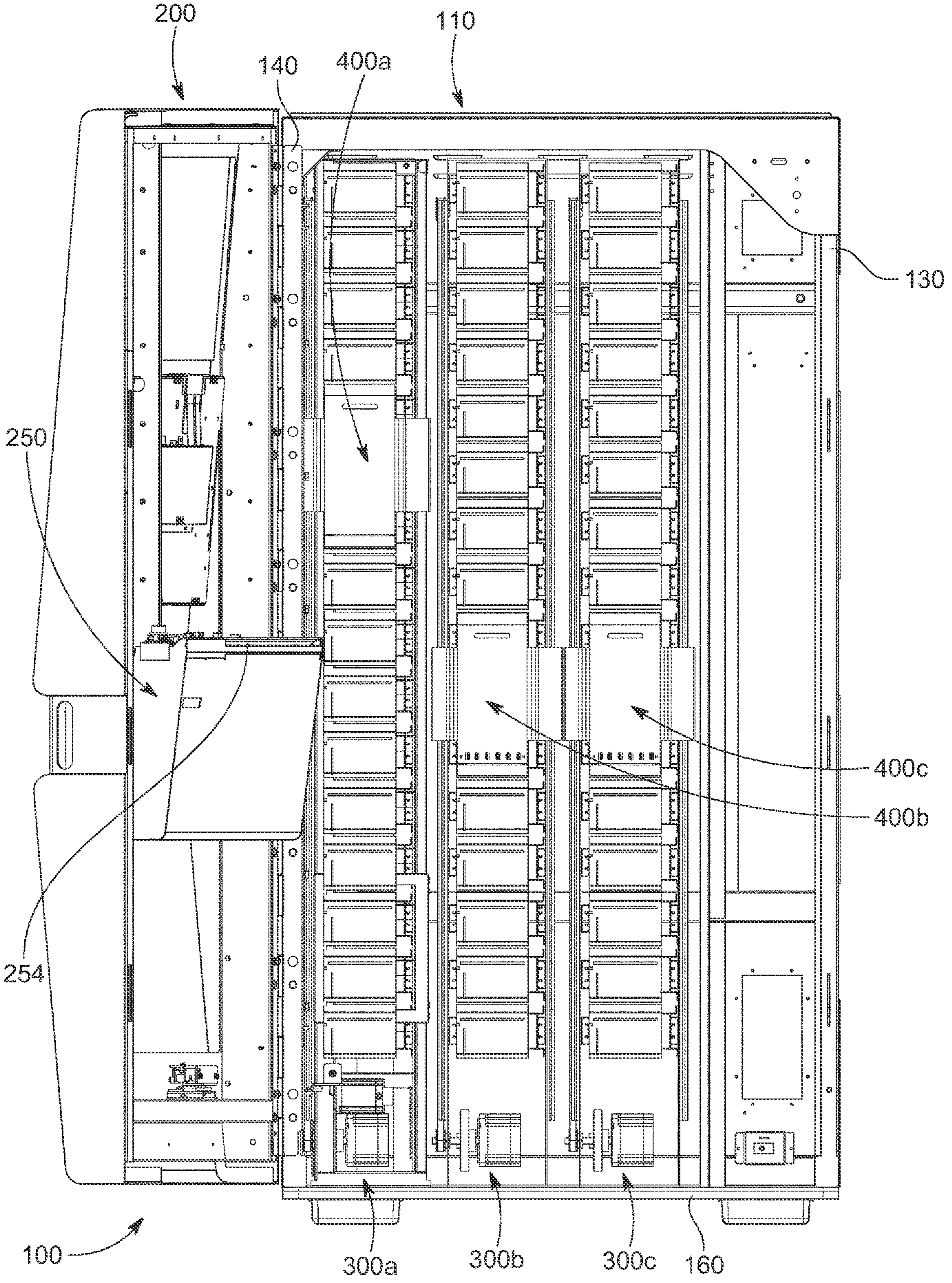
FIG. 3 is a front view of the lottery ticket vending machine of FIG. 1 shown with the front door thereof in the open position, shown with the left side wall panel thereof removed, showing the three ticket drawer columns and the three movable ticket bursters respectively associated the three ticket drawer columns, and showing the ticket collection receptacle of the front door.

In this illustrated example embodiment, the machine housing 110 includes a top wall 120, spaced-apart side walls 130 and 140, a rear wall 150, a base 160, and the openable front door 200 pivotally connected to the side wall 140. The base 160 is configured to rest on a floor or other suitable support. The machine housing 110 includes suitable vertically extending supports (not labeled) configured to hold and support the respective ticket drawer columns 300*a*, 300*b*, and 300*c*. The front door 200 is moveable from a closed and locked position covering the open front face of the machine housing 110 as shown in FIG. 1 to an open position allowing access to the interior of the machine housing 110 as shown in FIGS. 2 and 3. The front door 200 is mounted by hinges (not labeled) to the side wall 140 of the machine housing 110. A suitable locking mechanism (not shown) is mounted on the front door 200 and the side wall 130 of the machine housing 110 to facilitate locking of the front door 200 in the closed position. When the front door 200 is closed and locked, the interior of the machine housing 110 is generally secured so as to be inaccessible except by an authorized person. The front door 200 can include one or more areas for any components supported by the front door and/or that are contained in and/or protected by the structure of the front door 200. The front door 200 can include one or more openings such as for a glass panel that enables people to see into the machine housing 110 and for one or more of the purchaser interface components (such as those described below). The size and configuration of the machine housing can vary in accordance with the present disclosure.

The ticket collection receptacle 250 of the front door 200 is configured to receive lottery tickets from each of the movable ticket bursters 400*a*, 400*b*, and 400*c*. The ticket collection receptacle 250 is configured to hold each lottery ticket received from the movable ticket bursters to enable the respective purchaser to retrieve the dispensed lottery ticket from the ticket collection receptacle 250. The ticket collection receptacle defines an elongated horizontally extending ticket receiving slot 254 (best seen in FIGS. 2 and 3). The ticket collection receptacle 250 and the front door define an elongated horizontally extending ticket retrieval slot 278 (seen in FIG. 1). The ticket retrieval slot 278 is (and needs to be) large enough so that a purchaser can insert the purchaser's hand through the ticket retrieval slot 278 to retrieve lottery tickets that are dispensed into the ticket collection receptacle 250. The ticket receiving slot 254 is (and needs to be) small enough so that a purchaser cannot insert the purchaser's hand through the ticket receiving slot 254 and thereby cannot access any of the ticket drawers of the ticket drawer columns 300*a*, 300*b*, or 300*c*. The position, size, and configuration of the ticket collection receptacle can vary in accordance with the present disclosure.

Each of the ticket drawer columns 300*a*, 300*b*, and 300*c* are identical in this example embodiment. For brevity, only ticket drawer column 300*a* is described in detail herein. Likewise, the three movable ticket bursters 400*a*, 400*b*, and 400*c* are identical in this example embodiment. Likewise, each of the ticket drawers is identical in this example embodiment. For brevity, only ticket burster 400*a* associated with the ticket drawer column 300*a* is described herein and only one of the ticket drawers is described herein.

Ticket drawer column 300*a* includes a series of aligned ticket drawers (not individually labeled except drawer 350) that are vertically stacked in the column. Each of the ticket drawers is configured to hold one or more packs of lottery tickets such as instant lottery tickets for subsequent dispensing by the ticket vending machine 100. The ticket drawers can vary in quantity, size, and configuration depending upon the particular size of the ticket vending machine 100 and the quantity, size, and shapes of the lottery tickets that the ticket vending machine 100 can or will dispense. As further described below, each ticket drawer is configured to hold lottery tickets (such as instant lottery tickets) for selection by the purchasers. In various embodiments, the different ticket drawers can hold different lottery ticket packs for different lottery games, but it should be appreciated, that two or more ticket drawers can hold the same type of lottery tickets.

In various embodiments, the lottery tickets in each of the ticket drawers of the ticket drawer column 300*a* are movable into the associated ticket burster 400*a* after the ticket burster 400*a* is moved into alignment with such ticket drawer for receipt, bursting, and dispensing of that lottery ticket (such as shown in FIGS. 4, 5, 9, 10, and 11).

In this example embodiment, each of the ticket drawers of each of the ticket drawer columns includes or is associated with a ticket movement assembly. In this example embodiment, the ticket movement assemblies are identical so only ticket drawer movement assembly 360 of ticket drawer 350 is described herein for brevity.

Figure 6:
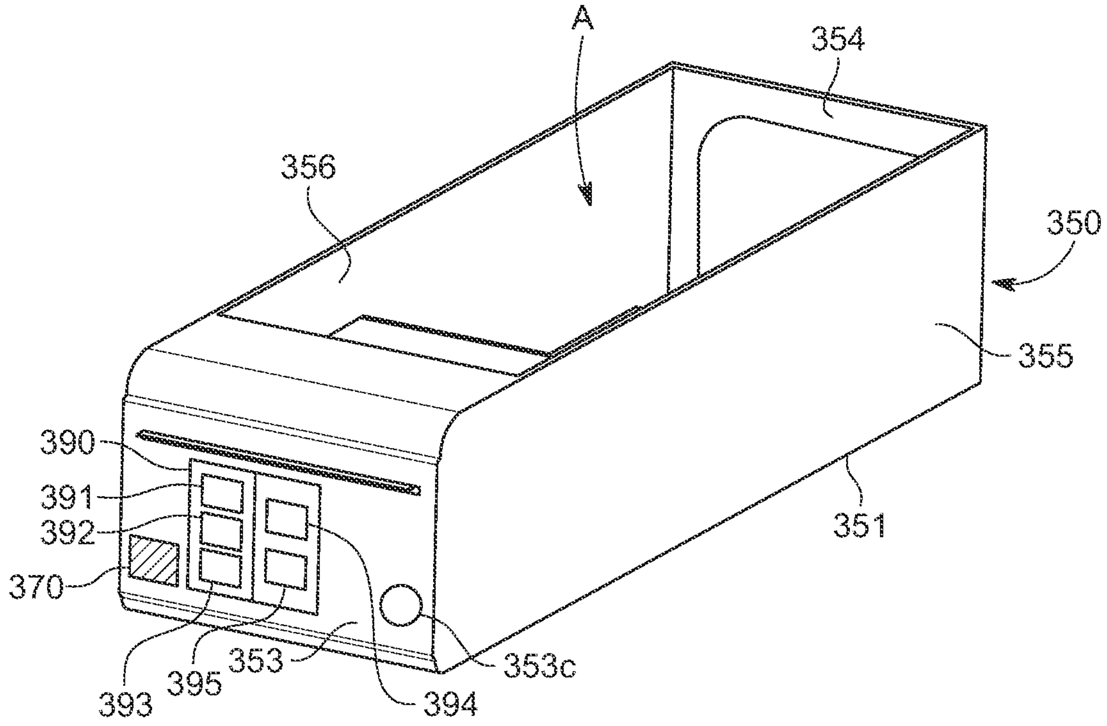
FIG. 6 is an enlarged front perspective view of one of the ticket drawers of the ticket drawer column of FIG. 4.
Figure 7:
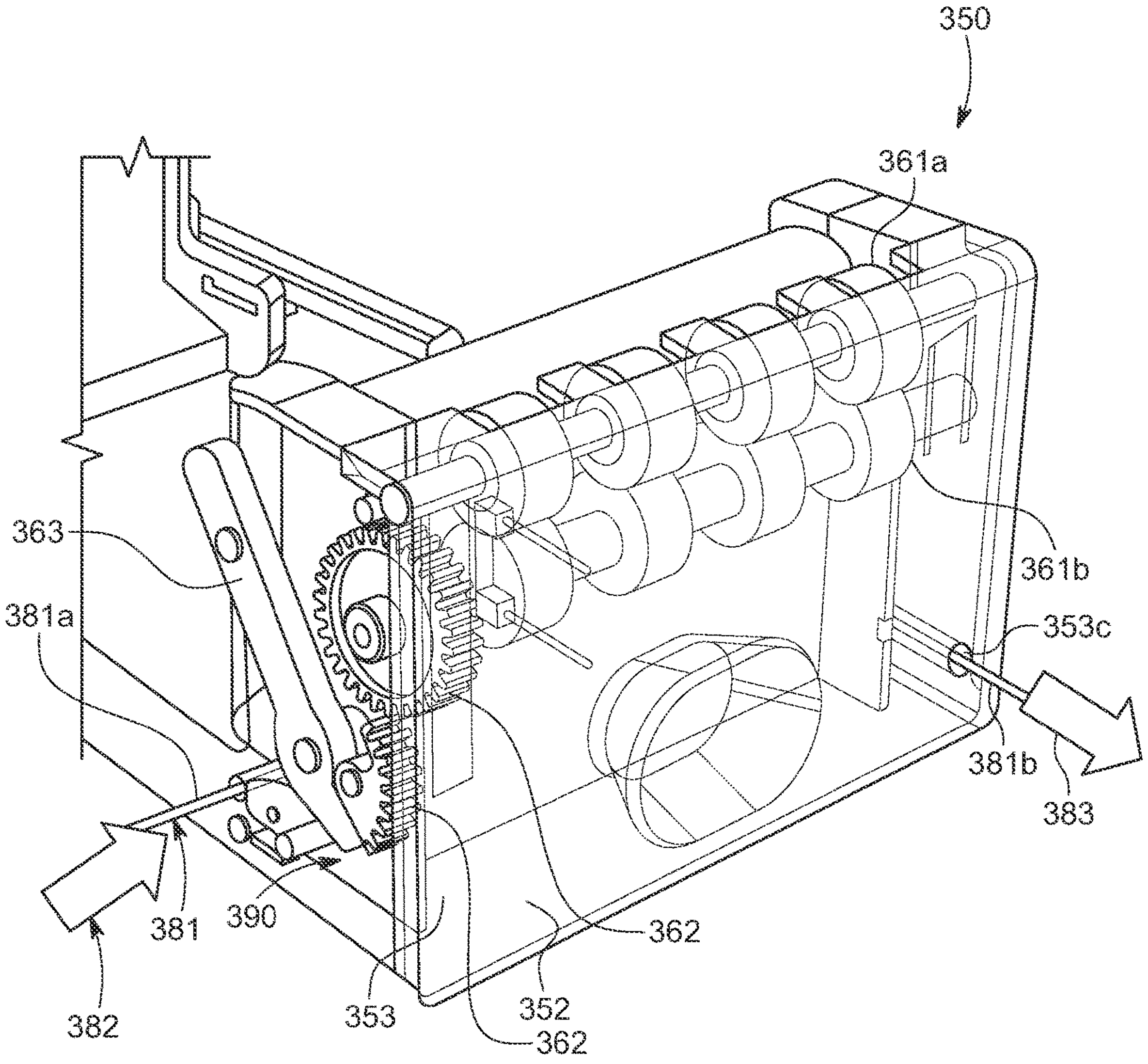
FIG. 7 is an enlarged fragmentary front perspective view of one of the ticket drawers of the ticket drawer column of FIG. 4 showing certain internal components thereof.
Figure 8:
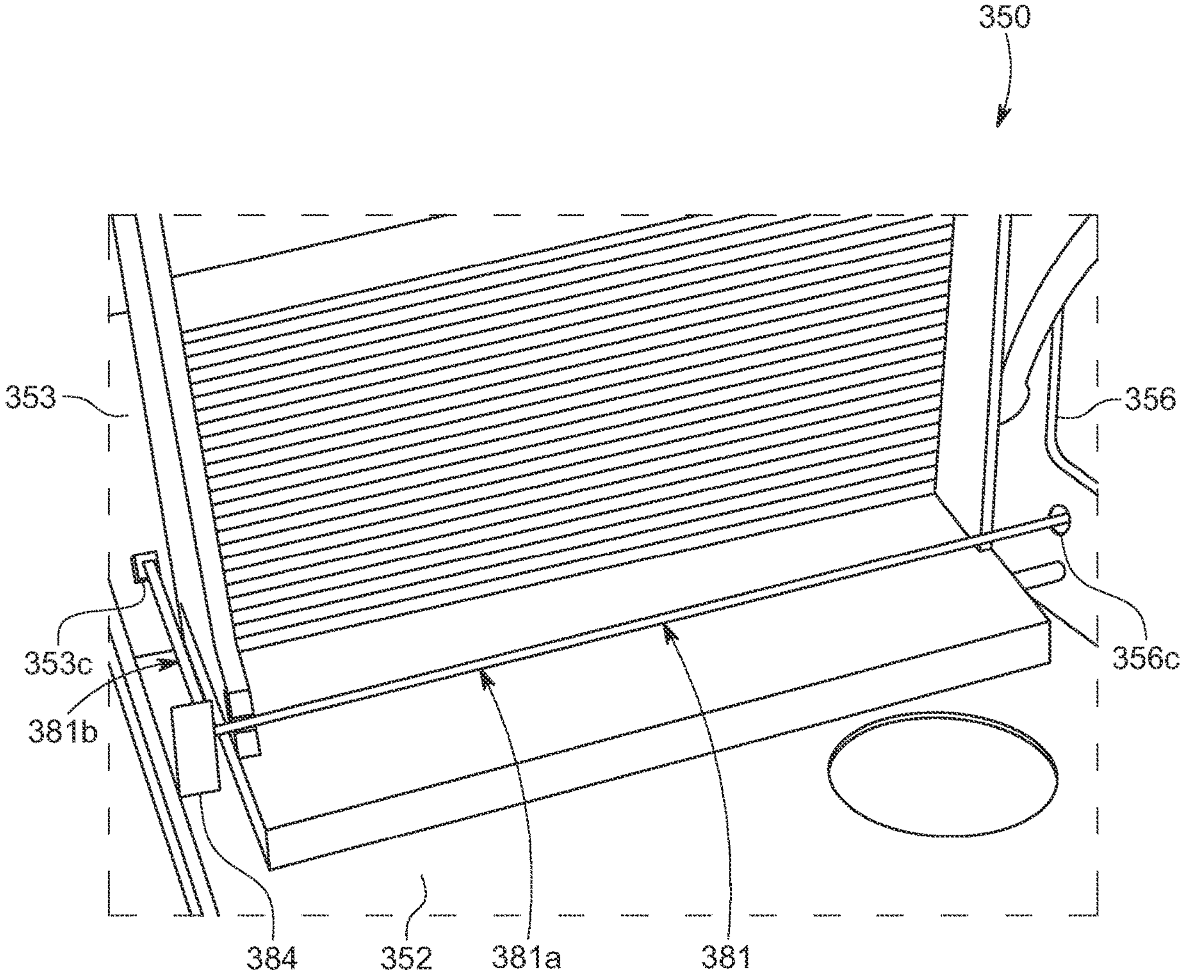
FIG. 8 is an enlarged fragmentary rear perspective view of one of the ticket drawers of the ticket drawer column of FIG. 4 showing certain internal components thereof.

More specifically, as illustrated in FIGS. 6, 7, and 8, the example ticket drawer 350 includes a drawer housing 351 configured to hold one or more packs of lottery tickets, and thus a quantity of lottery tickets. The housing 351 includes a bottom wall 352, a front wall 353 connected to and extending upwardly from the bottom wall 353, a rear wall 354 connected to and extending upwardly from the bottom wall 353, a first side wall 355 connected to and extending upwardly from the bottom wall 353, a second side wall 356 connected to and extending upwardly from the bottom wall 353, and a partial top wall (not labeled) connected to the front wall 353, the first side wall 355, and the second side wall 356. The front wall 353 is connected to the first side wall 355 and the second side wall 356, and the rear wall 354 is also connected to the first side wall 355 and the second side wall 356. The front wall 353 is spaced-apart from the rear wall 354, and the first side wall 355 is spaced-apart from the second side wall 356, such that the bottom wall 352, the front wall 353, the rear wall 354, the first side wall 355, and the second side wall 356 define an interior ticket pack receipt and holding area A for the ticket drawer 350 that is configured to hold a plurality of lottery tickets of one or more packs. The housing 351 can also include one or more interior structures (not labeled). The housing 351 also includes light beam channels for the purposes discussed below, and specifically, the second side wall 356 of the housing 351 defines a first light beam channel 356*c* and the front wall 353 of the housing 351 defines a second light beam channel 353*c*.

The ticket movement assembly 360 of the ticket drawer 350 is configured to move the leading lottery ticket in the ticket drawer 350 at least partially into the respective burster (such as burster 400*a*) when that burster is aligned with that ticket drawer 350 so that the ticket engagers of the burster can grip and then subsequently move that lottery ticket in that burster. In various embodiments, the burster includes an actuator (not shown) configured to engage an actuation lever of the ticket movement assembly 360 to cause the movement of the leading lottery ticket by the ticket drawer movement assembly 360. In this example embodiment, the ticket drawer movement assembly 360 includes ticket engagers 361*a* and 361*b* (that in this example include rollers (not labeled) mounted on shafts (not labeled)), gearing 362, and an actuation lever 363. The actuation lever 363 is engagable by an actuator (not shown) of the burster 400*a* (after the burster 400*a* is aligned with the ticket drawer 350) to cause the ticket movement assembly 360 to move a leading ticket in the ticket drawer 350 into the burster 400*a*. It should be appreciated that the movement of the lottery tickets into the bursters can be done in multiple other different ways in accordance with the present disclosure. As indicated above, one way is for the ticket drawer to have one or more drivable ticket engagers (such as rollers) that are configured to be activated to move each lottery ticket from the ticket drawer into the burster or to retract a lottery ticket from the burster back into the ticket drawer. The activation can be by way of an actuator of the burster or of the ticket drawer in different embodiments. Another one way is for the ticket drawer to have one or more drivable ticket engagers (such as rollers) that are configured to be activated to move each lottery ticket from the ticket drawer into the burster or to retract a lottery ticket from the burster back into the ticket drawer.

Figure 4:
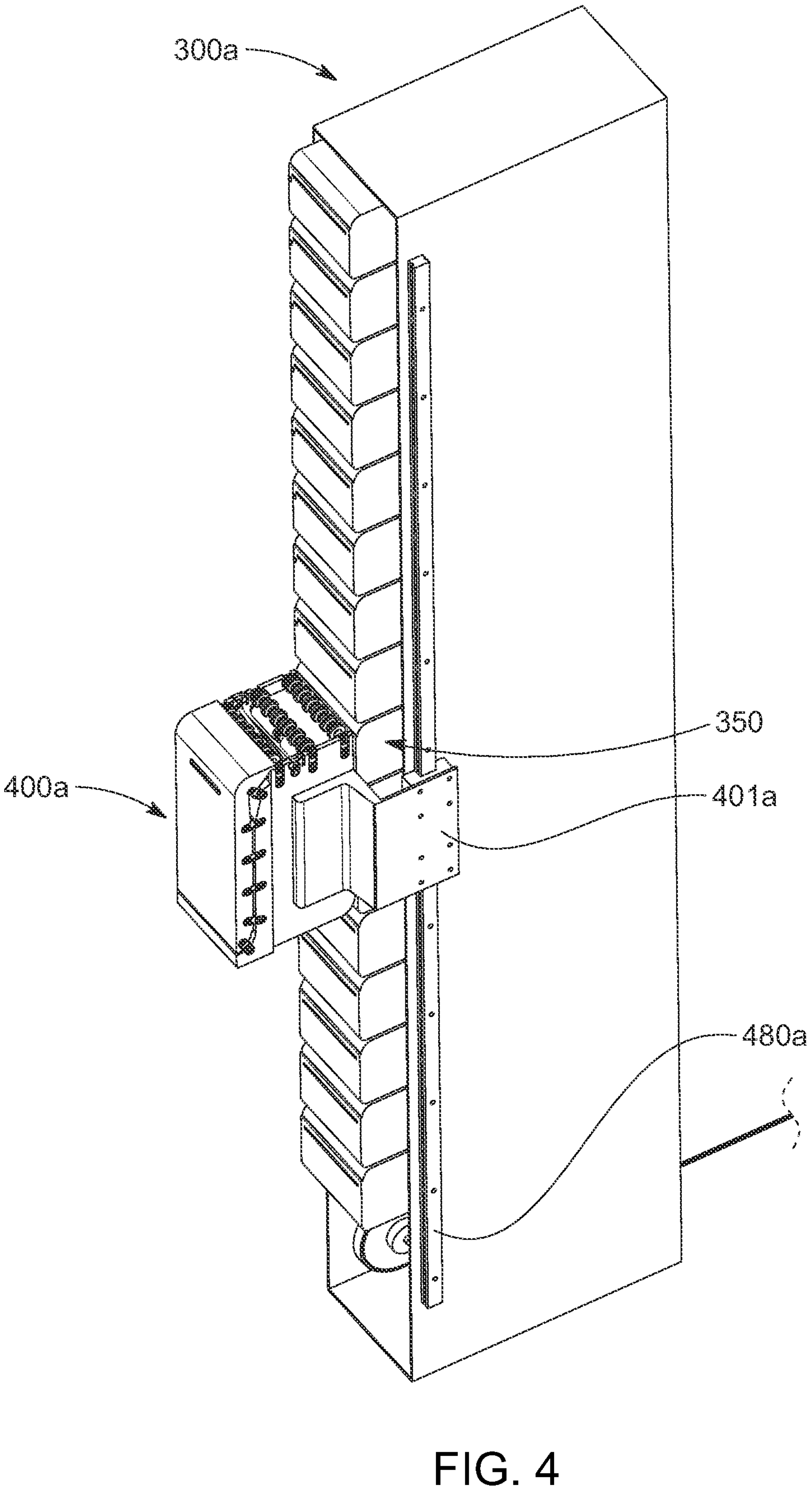
FIG. 4 is an enlarged fragmentary perspective view of one of the ticket drawer columns and the ticket burster associated with that ticket drawer column of the lottery ticket vending machine of FIG. 1.
Figure 5:
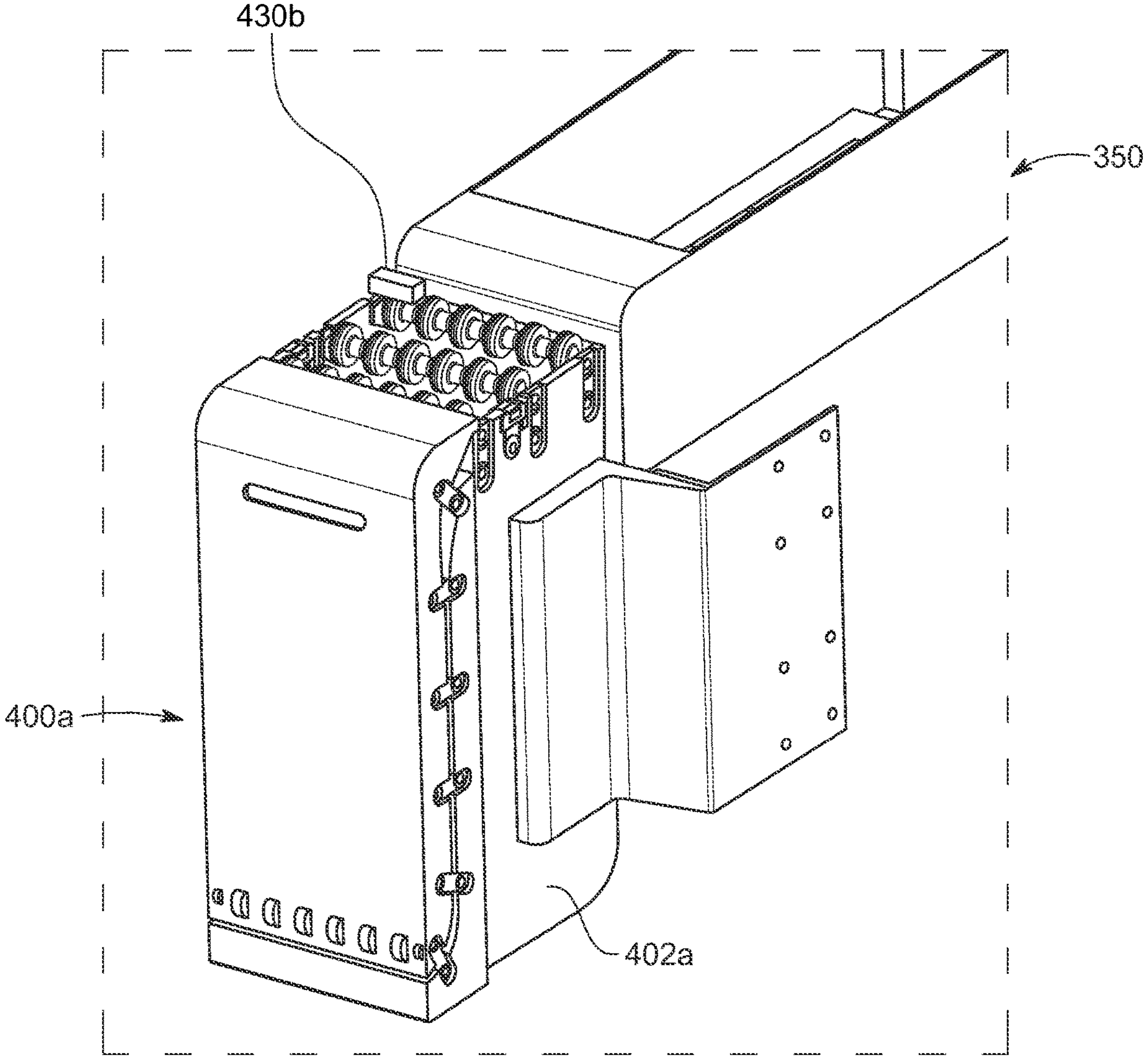
FIG. 5 is an enlarged fragmentary front perspective view of one of the ticket drawers of the ticket drawer column of FIG. 4 and the ticket burster of FIG. 4.
Figure 9:
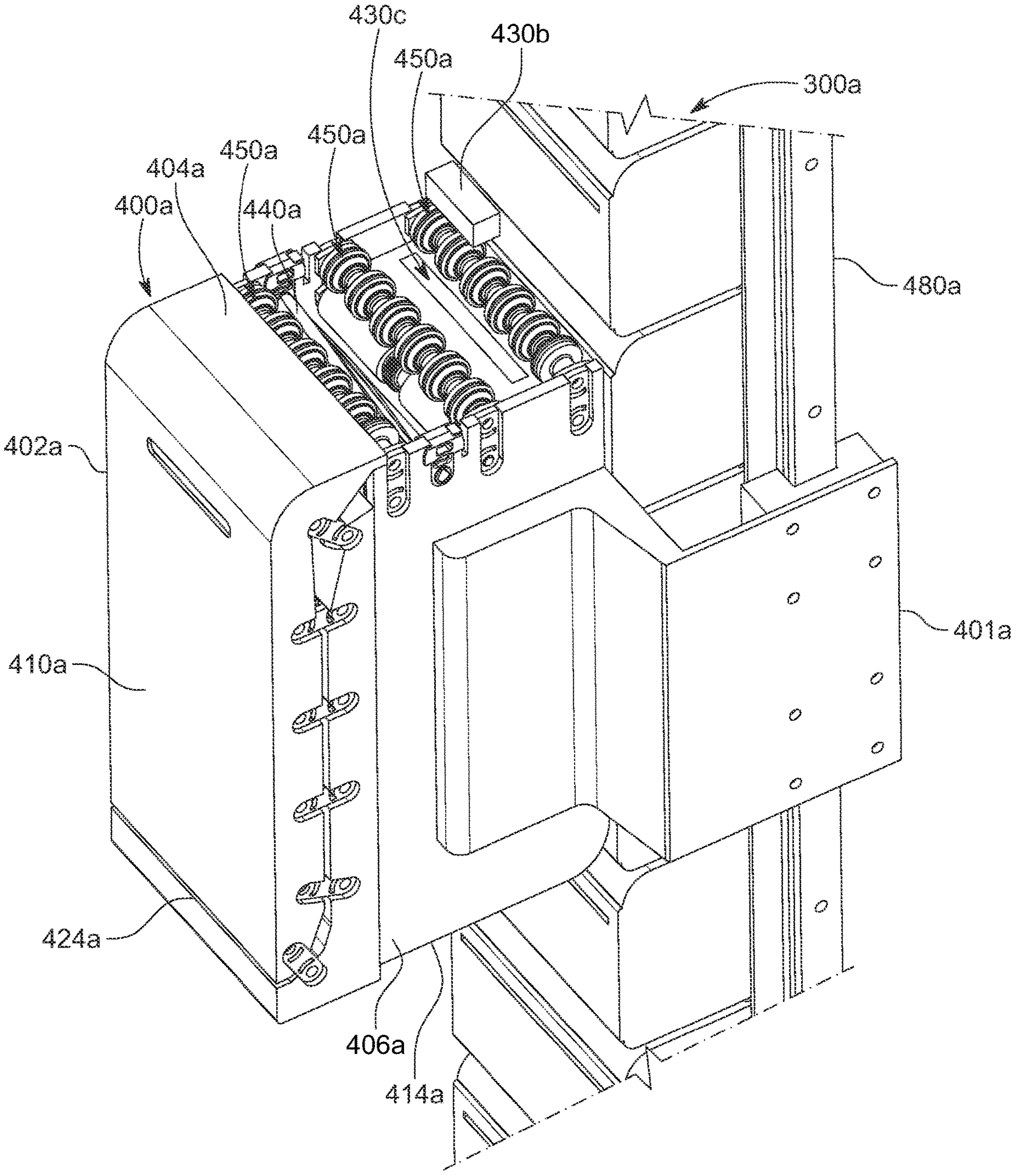
FIG. 9 is a further enlarged perspective view of part of the ticket drawer column of FIG. 4, and the burster of FIG. 5 aligned with one of the ticket drawers of the ticket drawer column.

As best shown in FIGS. 4 and 9, the movable ticket burster 400*a* is supported by one or more burster supporters (such as burster supporter 480*a*). The burster supporters can be any suitable structure(s) that support(s) the ticket burster 400*a* in a manner that enables the ticket burster 400*a* to vertically move to any of the different ticket receipt positions that are associated with and in alignment with the respective ticket drawers of the ticket drawer column 300*a*. Each of the burster supporters also support the ticket burster 400*a* in a manner that enables the ticket burster 400*a* to vertically move to into alignment with the ticket receptacle 250.

The ticket vending machine 100 includes one or more actuators (not shown) that control movement of the ticket burster 400*a* under control of the controller of the ticket vending machine 100 and/or the controller of the ticket burster 400*a*. In this example, an actuator (not labeled) is mounted at the bottom of the ticket drawer column 300*a* and coupled to the ticket burster 400*a* by suitable linkages (such as but not limited to pulleys and a drive belt (not labeled)). The actuator is configured to move the ticket burster 400*a* under the control of the controller(s) in the vertical (e.g., up and down) directions. The movable ticket burster 400*a* is thus moveable, via this actuator and linkages on the ticket burster supporters to different vertical locations including a plurality of the locations respectively associated and aligned with each of the ticket drawers of the ticket drawer column 300*a* such that the ticket burster 400*a* is positioned to receive one or more of the lottery tickets stored in each respective ticket drawer of the ticket drawer column 300*a* for obtaining and dispensing that lottery ticket into the ticket receptacle 250 for the purchaser as requested by the purchaser.

As best shown in FIGS. 4, 5, 9, 10, and 11, the example movable ticket burster 400*a* includes: (a) a burster housing 402*a*; (b) one or more burster supporter connecters (such as burster support connector 401*a* connecting the burster housing 402*a* and the burster supporter 480*a*); (c) a ticket cutter 440*a* in and supported by the burster housing 402*a*; (d) a plurality of ticket engagers 450*a* supported by the burster housing 402*a*; and (e) a burster controller (not shown), as further described below. Additionally, as further described herein, the ticket burster 400*a* also includes a plurality of different sensors configured to sense different characteristics regarding each of the ticket drawers in the ticket drawer column 300*a*. In this illustrated example embodiment, the ticket burster 400*a* includes: (i) a ticket pack sensor 430*a* supported by the burster housing 402*a*; (ii) a ticket exit 430*b* supported by the burster housing 402*a*; (iii) a barcode sensor 430*c* supported by the burster housing 402*a*; and (iv) a ticket drawer sensor 430*d* supported by the burster housing 402*a*. The respective functions of these four sensors are described below. It should be appreciated that the present disclosure also contemplates a lottery ticket vending machine employing less or more than all of these sensors, and particularly any suitable individual sensor or any suitable combination of these sensors.

More specifically, the burster housing 402*a* generally includes a top member 404*a*, spaced-apart side members 406*a* and 408*a*, a front member 410*a*, a rear member 412*a*, and a bottom member 414*a*. The burster housing 402*a* also includes a plurality of internal members (not individually labeled) that define a ticket inlet 422*a*, through which the ticket burster 400*a* is configured to receive a lottery ticket from a ticket drawer of the ticket drawer column 300*a*, a ticket outlet 424*a* through which the ticket burster 400*a* is configured to dispense the received instant lottery ticket into the ticket collection receptacle 250, and a ticket movement path (not labeled) extending from the ticket inlet 422*a* to the ticket outlet 424*a* and through which the lottery ticket is moved through the ticket burster 400*a*. The size, shape, and configuration of the ticket burster housing 402*a* and thus the ticket burster 400*a* can vary in accordance with the present disclosure.

The ticket cutter 440*a* is positioned in the burster housing 402*a* and configured to rotate to cut the perforations attaching each lottery ticket that moves along the ticket movement path in the ticket burster 400*a* to the next lottery ticket of the continuous strip of lottery tickets received from the ticket drawer. The ticket cutter 440*a* is configured to make such cut along the perforations between the two connected lottery tickets of such strip. The ticket cutter 440*a* is controlled by the burster controller and/or the controller of the ticket vending machine 100. In this example embodiment, the ticket cutter 440*a* is inwardly positioned (i.e., positioned downstream) from the ticket inlet 422*a*. After the ticket cutter 440*a* cuts the lottery ticket requested by the purchaser from the ticket drawer, the ticket movement assembly 360 of the ticket drawer can retract the portion of the next lottery ticket (of the strip of lottery tickets) from the ticket burster 400*a* before the ticket burster 400*a* moves from the ticket receipt position aligned with that ticket drawer. In other embodiments, the ticket burster 400*a* can be configured such that the ticket cutter is positioned closer to or on the other side of the ticket inlet (i.e., positioned upstream of the ticket inlet) such that after the ticket cutter cuts the lottery ticket along the perforations connecting that lottery ticket to the next lottery ticket in the strip, the ticket drawer may not need to withdraw the next lottery ticket in the strip or may only need to withdraw the next lottery ticket in the strip a relatively small distance. The position, size, and configuration of the ticket cutter can thus vary in accordance with the present disclosure.

In other embodiments, the ticket burster 400*a* can be configured such that the burster housing 402*a* is rotatable about a horizontal axis to separate (via a tearing and/or twisting motion) each lottery ticket along the perforations connecting that instant lottery ticket to the next lottery ticket in the strip. In such embodiments, the ticket drawer may not need to withdraw the next lottery ticket of the strip or may only need to withdraw the next lottery ticket of the strip a relatively small distance. In such embodiments, the ticket burster may not need a ticket cutter.

The ticket engagers 450*a* of the burster 400*a* in this example embodiment include multiple driven rollers (not labeled) and multiple guide rollers (not labeled). The driven rollers are rotated by suitable actuators (not shown) under the control of the burster controller and/or the controller of the ticket vending machine 100. The driven rollers and the guide rollers are configured to move (such as by pulling) and guide each lottery ticket along the ticket movement path and out of the ticket outlet 424*a*. In alternative embodiments, the ticket engagers are configured to grip and pull each lottery ticket from the respective ticket drawer.

The ticket burster 400*a* is configured to burst the perforations between the lottery ticket being dispensed and the next lottery ticket of the lottery ticket strip so as to enable the dispensed lottery ticket to be dispensed into the ticket receptacle 250. This prevents a person from being able to pull an extended number of lottery tickets from one of the ticket packs in one of the ticket drawers. It should be appreciated that the ticket burster 400*a* can be moved to a dispensing location for each instant lottery ticket dispensed, or for only certain of the lottery tickets dispensed. It should also be appreciated that the ticket burster can moved to a different location for any lottery ticket that is deemed to be bad or non-dispensable for any reason, and to deposit that ticket into a suitable rejection area.

The ticket vending machine of the present disclosure can have more than one ticket burster for each ticket drawer column such that they can operate at the same time, or such that one or more ticket bursters are back-ups in case there is an issue with one of the other ticket bursters for that ticket drawer column.

The burster controller (not shown) of the burster 400*a* can be any suitable type of controller (such as a programmable logic controller) that includes any suitable processing device(s) (such as a microprocessor, a microcontroller-based platform, an integrated circuit, or an application-specific integrated circuit) and any suitable memory device(s) (such as random access memory, read-only memory, or flash memory). The memory device(s) stores instructions executable by the processing device(s) to control operation of the ticket burster 400*a*. The burster controller can be hard wired or wirelessly connected to and in communication with the cutter 440*a*, the actuators for the driven rollers 450*a*, any actuators of the ticket burster 400*a* that cause the movement of the ticket burster 400*a*, and the sensors. In such embodiments, the burster controller can be wirelessly connected to and in communication with the controller of the ticket vending machine 100. In other embodiments, the ticket burster does not include a controller and is completely controlled by the controller of the ticket vending machine 100. In such embodiments, the controller of the ticket vending machine 100 can be hard wired to or wirelessly connected to and in communication with the cutter, the actuators for the driven rollers, any actuators on the ticket burster or the burster supporter that cause the movement of the ticket burster, and the sensors.

In various embodiments, the lottery ticket vending machine includes an operator interface (not shown) that enables the operator to enter information for each ticket drawer corresponding to the lottery tickets packs placed in that ticket drawer by the operator. This can include lottery game related information, lottery ticket pack related information, quantity of pack related information, quantity of lottery ticket related information, and/or other suitable information. In certain embodiments, the controller can also receive certain information from one or more automatic loading, automatic checking, or other similar processes.

The controller of the vending machine uses this information to track the quantity of lottery tickets that should initially be in each ticket drawer and that are dispensable from each ticket drawer. The controller further tracks the quantity of lottery tickets that should be in each ticket drawer based on the quantity of lottery tickets dispensed from that ticket drawer by the vending machine. The controller can use the information obtained from the sensors of the bursters as described herein to verify such lottery ticket count related information. The controller can also use other information (such as when a lottery game is discontinued such as due to the top award being won) received from an operator or a central lottery system. The controller can then use such information to control ticket state indicators for each lottery ticket drawer such as described below. In various embodiments, the controller of the lottery ticket vending machine tracks: (1) the quantity of lottery tickets in each pack in each ticket drawer; (2) the lottery games of the lottery tickets in each for relevant lottery ticket events (such as a discontinuation of a lottery game); and (3) any other events (such as jams) associated with each of the packs in each of the ticket drawers, and controls the lottery ticket state indicators for each ticket drawer based on such information. Additionally, in various embodiments, the controller is configured to receive and use data from the different sensors that provide information regarding the ticket drawers and the lottery tickets in each of the ticket drawers to determine and/or verify the lottery ticket state for each ticket drawer.

The controller of the ticket vending machine can be additionally configured to take one or more actions based on the determined quantity of lottery tickets in each ticket drawer as well as the ticket drawers themselves. In certain instances, the controller of the ticket vending machine does not need to take any action. In other instances, the controller of the ticket vending machine can take one or more of a series of different actions based on this information. In various different embodiments, the respective action taken can vary and can be any one or more of the following example actions: (1) cause a display of a message on a display device of the vending machine to alert an operator of the vending machine regarding the quantity of lottery tickets in a ticket drawer to enable the operator to act on such quantity; (2) send a message to a remote monitoring device separate from the vending machine regarding the quantity to enable an operator to act on such issue; (3) cause lottery tickets for a lottery game to no longer be available for purchase; and/or (4) cause one or more of the ticket state indicators (such as described herein) to indicate if a ticket drawer is full, empty, or low.

Ticket Level Determination Assembly and Ticket Pack Sensor of Ticket Burster

In this illustrated example embodiment, each of the ticket drawers of each of the ticket drawer columns includes or is associated with a ticket level determination assembly and each ticket burster includes a ticket pack sensor. In this example embodiment, the ticket level determination assemblies of each of the ticket drawers are identical so only one ticket level determination assembly is described herein for brevity. In this example embodiment, the ticket pack sensors of each of the ticket bursters are identical so only ticket pack sensor 430A of the burster 400*a* is described herein for brevity.

The ticket level determination assembly is configured to at least partially enable a determination or verification by the controller of a burster and/or the controller of the vending machine 100 of the state of the lottery tickets in the ticket drawer that the ticket level determination assembly is associated with.

In this example embodiment, the ticket level determination assembly includes certain components shown in FIGS. 7 and 8 and a light beam source (not shown) that is suitably mounted adjacent to the ticket drawer 350 and configured to create a light beam 381 that extends in the directions of the arrows 382 and 383 shown in FIGS. 7 and 8. The ticket level determination assembly includes a reflector 384 (such as a mirrored member configured to redirect the light beam 381 as shown in FIG. 8). In operation, the light beam source creates the light beams 381 that has a first component 381*a* that travels through the light channel 356*c* and into the lottery ticket holding area A of the ticket drawer 350. The first component 381*a* of the light beam 381 is deflected by the reflector 384 and to create the second component 381*b* of the light beam 381 that travels through the light channel 353*c* and out of the ticket drawer 350. Thus, the light beam 381 is configured to move through the lottery ticket holding area A of the ticket drawer 350 and to the burster 400*a* when the burster 400*a* is aligned with the ticket drawer 350.

The movable ticket burster 400*a* is moveable to a position associated with each of the ticket drawers in the ticket drawer column 300*a* and the ticket pack sensor 430*a* of the burster 400*a* is configured to sense the light beam 381 from the ticket level determination assembly of each ticket drawer in the ticket drawer column to enable a determination or verification regarding the status of the lottery tickets in that ticket drawer. As mentioned above, the movable ticket burster 400*a* includes a first sensor 430*a* as best shown in FIG. 11, and that ticket pack sensor 430*a* is configured to sense the light beam 381 to enable a determination and/or verification of lottery tickets in the ticket drawer 350. More specifically, the ticket pack sensor 430*a* of the ticket burster 400*a* is on the inner lower side of the housing 402*a* and is supported by the housing 402*a* of the ticket burster 400*a*. The ticket pack sensor 430*a* is configured to be aligned with the light beam channel 353*c* such that it can sense the light beam 381 extending through the light beam channel 353*c*. In this example embodiment, the ticket pack sensor 430*a* is on one side of the housing 402*a*. In other alternative embodiments that are not shown, the ticket pack sensor 430*a* can be in another suitable location. The first sensor 430*a* is configured to communicate data (regarding the sensed light beam) to the burster controller and/or the controller of the ticket vending machine 100. The burster controller and/or the controller of the ticket vending machine 100 are configured to analyze this received data and partially determine and/or verify a quantity of the lottery tickets in the ticket drawer 350 based on this data. In various embodiments, this data provides information relative to whether lottery tickets are in the ticket drawer 350.

In this example embodiment, when no lottery tickets are in the ticket drawer 350, the light beam 381 is not blocked by any of the lottery tickets. Thus, when the burster 400*a* is aligned with the ticket drawer 350, the ticket pack sensor 430*a* of the burster 400*a* can sense the light beam and provide data regarding the sensed the light beam to the controllers of the burster 400*a* and/or the controller of the vending machine 100.

In this example embodiment, when a first small quantity of lottery tickets are in the ticket drawer 350, the light beam 381 is not blocked by such lottery tickets that are in the ticket drawer 350. Thus, when the burster 400*a* is aligned with the ticket drawer 350, the ticket pack sensor 430*a* of the burster can sense the light beam and provide data regarding the sensed the light beam to the controllers of the burster 400*a* and/or the controller of the vending machine 100.

In this example embodiment, when a larger quantity of lottery tickets are in the ticket drawer 350, the light beam 381 is blocked by such lottery tickets that are in the ticket drawer 350. Thus, when the burster 400*a* is aligned with the ticket drawer, the ticket pack sensor 430*a* of the burster 400*a* does not sense the light beam and can provide data regarding the light beam not being sensed to the controller of the burster 400*a* and/or the controller of the vending machine 100. It should be appreciated that if the light beam 381 is blocked, this can indicate that one or more packs of lottery tickets are in the ticket drawer.

In this example embodiment, the ticket pack sensor 430*a* can measure pack thickness above 0.1575 inches (0.40005 cms) and thus provide such information to the controller(s) to enable the controller(s) to determine and/or verify a quantity of lottery tickets in the ticket drawer 350.

Ticket Drawer Ticket Exit Sensor of Ticket Burster

In this illustrated example embodiment, each of the ticket bursters includes a ticket exit sensor. In this example embodiment, the ticket exit sensors of each of the ticket bursters are identical so only ticket exit sensor 430*b* is described herein for brevity.

The movable ticket burster 400*a* is moveable to a position associated with each of the ticket drawers in the ticket drawer column 300*a* and the ticket exit sensor 430*b* of the burster 400*a* is configured to sense a lottery ticket at the exit of the ticket drawer that can be moved into the ticket burster. The second sensor 430*b* as best shown in FIG. 10 is configured to sense a leading edge of a lottery ticket or a portion of the lottery ticket adjacent to the leading edge.

In this example embodiment, the ticket exit sensor 430*a* is configured to enable a determination and/or verification of a lottery ticket in the ticket drawer 350 ready to exit the ticket drawer 350 and enter the ticket burster 400*a*. More specifically, in this example embodiment, the ticket exit sensor 430*b* of the ticket burster 400*a* is on the inner upper side of the housing 402*a* and is supported by the housing 402*a* of the ticket burster 400*a*. In this example embodiment, the ticket exit sensor 430*b* is configured to be aligned above the exit of the ticket drawer 350 such that it can sense the leading edge of a lottery ticket at the exit of the ticket drawer 350. In this example embodiment, the ticket exit sensor 430*b* is on one side of the housing 402*a*. In other alternative embodiments that are not shown, the ticket exit sensor 430*b* can be in another suitable location.

The ticket exit sensor 430*b* is configured to communicate data (regarding the sensed ticket edge) to the burster controller and/or the controller of the ticket vending machine 100. The burster controller and/or the controller of the ticket vending machine 100 are configured to analyze this data and partially determine and/or verify that the ticket drawer 350 is ready to dispense a lottery ticket in the ticket drawer 350 based on this data. In various embodiments, this data provides information relative to whether lottery tickets are in the ticket drawer 350. The ticket exit sensor 430*b* can be any suitable sensor.

In other example embodiments, the ticket exit sensor is alternatively configured. In one such example embodiment, the ticket exit sensor uses a light beam sent inside the ticket drawer and redirected through a ticket exit slit using light guides that reflect or do not reflect a light beam back to the ticket exit sensor depending on whether a lottery ticket is at a ticket exit position in the ticket drawer. The ticket exit sensor is configured to communicate data (regarding the sensed lottery ticket) to the burster controller and/or the controller of the ticket vending machine 100.

Ticket Barcode Sensor of Ticket Burster

In this illustrated example embodiment, each of the ticket bursters includes a barcode sensor. In this example embodiment, the barcode sensors of each of the ticket bursters are identical so only barcode sensor 430*c* is described herein for brevity.

The movable ticket burster 400*a* is moveable to a position associated with each of the ticket drawers in the ticket drawer column 300*a* and the barcode sensor 430*c* of the burster 400*a* is configured to scan the barcode of each lottery ticket as that lottery ticket moves through the ticket burster 400*a*.

Generally, the barcode sensor 430*c* is configured to enable a determination and/or verification of each lottery ticket in the ticket drawer 350 that moves into the ticket burster 400*a*. The barcode sensor 430*c* of the ticket burster 400*a* is supported by the housing 402*a* of the ticket burster 400*a*. The barcode sensor 430*c* is configured such that it can read the barcode of each lottery ticket. Specifically, the barcode scanner 430*c* is positioned in the housing 402*a* such that it can emit light waves to read the respective barcodes on the back side of each lottery ticket as that lottery ticket moves in the ticket movement path and through the top of a barcode scan area (not labeled). The barcode sensor 430*c* can be in any suitable location in which the barcode sensor 430*c* can read the barcode of each lottery ticket. The barcode sensor 430*c* is configured to communicate data (regarding the sensed barcode for each lottery ticket) to the burster controller and/or the controller of the ticket vending machine 100. The burster controller and/or the controller of the ticket vending machine 100 are configured to analyze this data and partially determine and/or verify that the lottery tickets in the ticket drawer 350 based on this data. In various embodiments, this data provides information relative to whether multiple lottery ticket packs are in the ticket drawer 350. In other words, based on a scanned barcode, the controller(s) can determine if a lottery ticket from a second lottery ticket pack is received by the ticket burster and thus if an additional pack is in the ticket drawer 350.

In various embodiments, the sensor 430 can provide signals that represent data to the controller(s), wherein the data represents certain information for the controllers of the burster and/or the vending machine to use to enable such controller(s) to determine or verify the state of the lottery tickets in such ticket drawer 350.

In various embodiments, the controller(s) is/are configured to use this data to partially determine or verify the lottery ticket state for each of a plurality of ticket drawers of the lottery ticket vending machine 100, and to provide indications of the lottery ticket state for each of the ticket drawers of the lottery ticket vending machine 100.

In various embodiments, this multiple pack recognition can be used by the vending machine and/or the operator thereof to know that a lottery ticket for a new lottery game may be the next ticket in a ticket drawer (and to thus expect a new bar code for the next ticket from that ticket drawer). The present disclosure contemplates that the lottery ticket vending machine can ready itself for that new information regarding the next lottery ticket.

In various embodiments, since the vending machine is regularly monitoring the dispensed lottery tickets, the vending machine will often be able to detect a multiple pack issue before the issue becomes an issue that causes the vending machine to shut down and stop dispensing lottery tickets.

In various embodiments, the controller of the vending machine 100 can track, for each ticket drawer, the lottery tickets dispensed from a known ticket pack in that ticket drawer. If an operator attached (such as using tape) a second ticket pack to the known ticket pack in the ticket drawer, and the controller does not know this (such as because the operator did not input information regarding this second pack for the controller to know about this second pack or because such information was not otherwise received), the signals received from the barcode sensor 430*c* can inform the controller that more lottery tickets than expected (such as lottery tickets from an additional pack) are in the ticket drawer. The controller can act appropriately including requesting more information from the operator or expecting different lottery tickets to be in that ticket drawer. The controller can cause the respective lottery ticket state indicator to indicate this.

Ticket Drawer Sensor of Ticket Burster

In this illustrated example embodiment, each of the ticket bursters includes a ticket drawer sensor. In this example embodiment, the ticket drawer sensors of each of the ticket bursters are identical so only ticket drawer sensor 430*d* is described herein for brevity.

The movable ticket burster 400*a* is moveable to a position associated with each of the ticket drawers in the ticket drawer column 300*a* and the ticket drawer sensor 430*d* of the burster 400*a* is configured to sense whether a ticket drawer is present at an expected location in the ticket drawer column for that ticket drawer, to enable a determination or verification regarding the status of the lottery tickets in the ticket drawers in that ticket drawer column.

More specifically, the ticket drawer sensor 430*d* of the ticket burster 400*a* is on the inner lower side of the housing 402*a* and is supported by the housing 402*a* of the ticket burster 400*a*. The ticket drawer sensor 430*c* is configured to be aligned below the exit of the ticket drawer 350 such that it can sense a part of the ticket drawer 350 (such as a reflector 370 of the ticket drawer 350 as described below). In this example embodiment, the ticket drawer sensor 430*d* is on one side of the housing 402*a*. In other alternative embodiments that are not shown, the ticket drawer sensor 430*d* can be in another suitable location. The ticket drawer sensor 430*d* is configured to communicate data (regarding the sensed ticket drawer) to the burster controller and/or the controller of the ticket vending machine 100. The burster controller and/or the controller of the ticket vending machine 100 are configured to analyze this data and partially determine and/or verify that the ticket drawer 350 is in an expected position and thus ready to dispense a lottery ticket in the ticket drawer 350 based on this data. In various embodiments, this data provides information relative to whether the expected lottery tickets are in the ticket drawer 350. The ticket drawer sensor 430*d* can be any suitable sensor.

In this example embodiment, each the ticket drawers such as ticket drawer 350 includes a reflector 370 that can be sensed by the ticket drawer sensor 430*d*. In certain embodiments, each of the reflectors is the same so that the ticket drawer sensor can only sense that a ticket drawer sensor is present, but not whether the correct ticket drawer is in a correct or expected location in the ticket drawer column.

In other embodiments, each of the reflectors is different or includes a different pattern (such as a different code) that can be sensed by the ticket drawer sensor 430*d*. This enables the ticket drawer sensor 430*a* to sense and provide data to the controller(s) based on the specific ticket drawer to enable the determination by the controller of whether the expected ticket drawer is in the expected position in the ticket drawer column. In other words, this enables the controller to determine if an operator incorrectly placed a ticket drawer in an incorrect position in a ticket drawer column, and if so, to alert the operator of such issue. The ticket drawer sensor 430*d* can this be configured to enable a determination and/or verification of the presence of the ticket drawer 350 ticket drawer 350 in the correct location in the ticket drawer column.

Ticket State Indicators

In various embodiments, the controller(s) are configured to cause one or more lottery ticket state indicators to display an indication of the lottery ticket state for such ticket drawer. In various embodiments, the controller(s) are configured to cause a lottery ticket state indicator associated with each ticket drawer to display an indication of the lottery ticket state for such ticket drawer. In various embodiments, the controller(s) are configured to cause a lottery ticket state indicator associated with each ticket drawer to display an indication of the lottery ticket state for such ticket drawer.

Figure 6A:
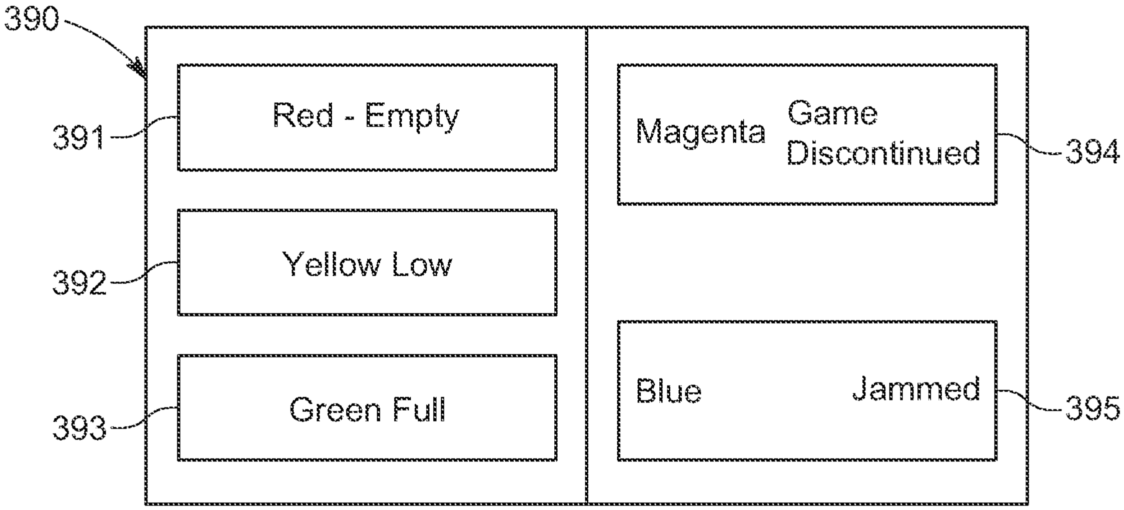
FIG. 6A is an enlarged front view of part of the ticket drawer of FIG. 6 and showing a lottery ticket state indicator of that ticket drawer.

In one example embodiment, each of the ticket drawers of each of the ticket drawer columns includes or is associated with a lottery ticket state indicator. FIGS. 6 and 6A show an example lottery ticket state indicator for the lottery ticket drawer 350. For ease of explanation, the ticket state indicator 390 for the ticket drawer 350 in this example embodiment is mounted on the front wall 353 of the ticket drawer 350. This example lottery ticket state indicator 390 is suitably communicatively connected to one of the controllers. This example lottery ticket state indicator 390 includes a plurality of state indicators including: (1) an empty state indicator 391; (2) a low state indicator 392; (3) a full state indicator 393; (4) a lottery game discontinued indicator 394; and (5) a jammed state indicator 395. The empty state indicator 391, when illuminated, indicates that the ticket drawer 350 is empty. The low state indicator 392, when illuminated, indicates that the ticket drawer 350 is low or close to empty. The full state indicator 393, when illuminated, indicates that the ticket drawer 350 is full. The lottery game discontinued indicator 394, when illuminated, indicates that the lottery game that is associated with the lottery tickets in the ticket drawer 350 has been discontinued. The jammed state indicator 395, when illuminated, indicates that there is a jam in the ticket drawer 350. In various embodiments, the controller can cause one or more of the indicators to blink to better catch the eye of an operator or for other purposes. This lottery ticket state indicator 390 thus indicates to an operator of the vending machine 100 information regarding the ticket state for each of the respective ticket drawers of the vending machine 100. This enables the operator to more quickly spot, determine, and address any issues such as jammed ticket drawers (that need to be fixed), ticket drawers that are empty or close to being empty (i.e., low) and thus need to be refilled, and ticket drawers that have lottery tickets that are discontinued (and thus have to be replaced).

In this example embodiment, this example lottery ticket state indicator 390 includes five separate illuminable state indicators 391, 392, 393, 394, and 395 (such as LED lights) that indicate information to the operator of the vending machine under the control of one of the controller(s). In alternative embodiments, the lottery ticket vending machine includes only one lottery ticket state indicator (such as one LED light) for each ticket drawer that is configured to indicate each of the different lottery ticket states such as the example lottery ticket states described above (e.g., empty, low, full, discontinued, and jammed).

In this example illustrated embodiment, this example lottery ticket state indicator 390 is mounted on the lottery ticket drawer 350. In other example embodiments, the lottery ticket state indicators for each of the ticket drawers is mounted adjacent to the ticket drawer such as on a support for the ticket drawer. For example, one or more lottery ticket state indicators for each ticket drawer of a ticket drawer column can be supported by a support (such as but not limited to a support for the ticket drawer) adjacent to that ticket drawer.

In various further alternative embodiments, the lottery ticket vending machine includes multiple lottery ticket state indicators that are respectively configured to display the lottery ticket states for each of the ticket drawers of each of the drawer columns such as a separate lottery ticket state indicator for each drawer column. In such example, the controller(s) can cause the states of the ticket drawers in a ticket drawer column to be indicated sequentially and/or at the request of an operator.

In various further alternative embodiments, the lottery ticket vending machine includes the lottery ticket state indicators on each of the bursters associated with the ticket drawers and/or ticket drawer columns. In such case, when a burster is aligned with a ticket drawer, the burster will cause the lottery ticket state indicators of that burster to display the lottery ticket state for that ticket drawer.

In various further alternative embodiments, the lottery ticket vending machine includes the lottery ticket state indicators for each of the ticket drawers on one or more display devices that are separate from the lottery ticket drawers and ticket drawer columns. For example, FIG. 12 shows an interface displayed by the display device 180 of the vending machine 100. This interface displays, for each ticket drawer of the first ticket column, an indicator of the ticket drawer (e.g., the numbers 1 to 16), and an indicator of the ticket state for that ticket drawer (e.g., empty, low, full, discontinued, or jammed). In this example, the interface displays the information for one of the ticket drawer columns and can enable the operator to switch the drawer column for which the ticket state information is displayed (such as via a suitable input device). In other embodiments, the interface can display the information for each of the ticket drawers for multiple ticket drawer columns, or each of the ticket drawers for all of the ticket drawer columns.

It should be appreciated that the lottery ticket state indicators can additionally be configured to indicate other suitable lottery ticket states.

It should further be appreciated from the above that various embodiments of the present disclosure provide a lottery ticket vending machine comprising: a housing; a ticket drawer column in the housing, the ticket drawer column comprising a plurality of ticket drawers, each of the ticket drawers configured to hold one or more packs of lottery tickets; and a ticket burster in the housing, the ticket burster defining a ticket inlet and a ticket outlet, the ticket burster movable to a plurality of different ticket receipt positions, each different ticket receipt position associated with and in alignment with a separate one of the ticket drawers, the ticket burster comprising a ticket pack sensor, a ticket exit sensor, a barcode sensor, and a ticket drawer sensor. In various such embodiments, for each of the ticket drawers, the ticket pack sensor is configured to detect multiple packs of lottery tickets in that ticket drawer when the ticket burster is aligned with that ticket drawer. In various such embodiments, for each of the ticket drawers, the ticket exit sensor is configured to sense a lottery ticket in an exit position of that ticket drawer when the ticket burster is aligned with that ticket drawer. In various such embodiments, for each of the ticket drawers, the barcode sensor is configured to determine a barcode of a lottery ticket received from that ticket drawer by the ticket burster when the ticket burster is aligned with that ticket drawer. In various such embodiments, for each of the ticket drawers, the ticket drawer sensor is configured to sense a presence of the ticket drawer when the ticket burster is aligned with that ticket drawer. In various such embodiments, for each of the ticket drawers, the ticket pack sensor is configured to detect multiple packs of lottery tickets in that ticket drawer when the ticket burster is aligned with that ticket drawer, the ticket exit sensor is configured to sense a lottery ticket in an exit position of that ticket drawer when the ticket burster is aligned with that ticket drawer, the barcode sensor is configured to determine a barcode of a lottery ticket received from that ticket drawer by the ticket burster when the ticket burster is aligned with that ticket drawer, and the ticket drawer sensor is configured to sense a presence of the ticket drawer when the ticket burster is aligned with that ticket drawer.

It should further be appreciated from the above that various embodiments of the present disclosure provide a lottery ticket vending machine comprising: a housing; a ticket drawer column in the housing, the ticket drawer column comprising a plurality of ticket drawers, each of the ticket drawers configured to hold one or more packs of lottery tickets, each ticket drawer comprising a reflector; and a ticket burster in the housing, the ticket burster defining a ticket inlet and a ticket outlet, the ticket burster movable to a plurality of different ticket receipt positions, each different ticket receipt position associated with and in alignment with a separate one of the ticket drawers, the ticket burster comprising a ticket drawer sensor, wherein for each ticket drawer, the ticket drawer sensor is configured to sense the reflector of that ticket drawer when the ticket burster is aligned with that ticket drawer. In various such embodiments, the reflectors of all of the ticket drawers are the same. In various such embodiments, the reflectors of all of the ticket drawers are different. In various such embodiments, the reflector of each ticket drawer comprises a different pattern that can be sensed by the ticket drawer sensor. In various such embodiments, the reflector of each ticket drawer comprises a different code that can be sensed by the ticket drawer sensor. In various such embodiments, the ticket burster comprises one of a ticket pack sensor, a ticket exit sensor, a barcode sensor. In various such embodiments, the ticket burster comprises a ticket pack sensor and a barcode sensor. In various such embodiments, the ticket burster comprises a ticket pack sensor, a ticket exit sensor, and a barcode sensor.

It should further be appreciated from the above that various embodiments of the present disclosure provide a lottery ticket vending machine comprising: a housing; a lottery ticket drawer supported by the housing; a ticket burster supported by the housing, the ticket burster defining a ticket inlet and a ticket outlet, the ticket burster comprising a ticket pack sensor, a ticket exit sensor, a barcode sensor, and a ticket drawer sensor; and a controller supported by the housing, the controller configured to receive data from the ticket pack sensor, the ticket exit sensor, the barcode sensor, and the ticket drawer sensor, the controller configured to, based on the data, determine a state of the ticket drawer and to cause an action to be taken responsive to determining the state of the ticket drawer. In various such embodiments, the action comprises sending a message to a remote device. In various such embodiments, the action comprises causing a display by a display device of an indication of a state of the ticket drawer. In various such embodiments, the action comprises causing a display by a display device of an indication that the ticket drawer is in an incorrect position. In various such embodiments, the action comprises causing a display by a display device of an indication that the ticket drawer is full and ready to dispense a lottery ticket. In various such embodiments, the action comprises causing a display by a display device of an indication that the ticket drawer is empty.

Various changes and modifications to the present embodiments described herein will be apparent to those skilled in the art. Such changes and modifications can be made without departing from the spirit and scope of the present subject matter and without diminishing its intended technical scope. It is therefore intended that such changes and modifications be covered by the appended claims.

The invention claimed is:

1. A lottery ticket vending machine comprising:

a housing;

a ticket drawer column in the housing, the ticket drawer column comprising a plurality of ticket drawers, each of the ticket drawers configured to hold one or more packs of lottery tickets, each ticket drawer comprising a ticket movement assembly, a reflector, and a ticket level determination assembly; and a ticket burster in the housing, the ticket burster comprising a burster housing defining a ticket inlet and a ticket outlet positioned lower in the burster housing than the ticket inlet, the ticket burster movable to a plurality of different ticket receipt positions, each different ticket receipt position associated with and in alignment with a separate one of the ticket drawers, the ticket burster comprising:

a ticket pack sensor connected to the burster housing and positioned to sense, for each of the ticket drawers when the ticket burster is aligned with the ticket drawer, a light beam from the ticket level determination assembly of the ticket drawer to enable a determination regarding a quantity of the lottery tickets in the ticket drawer, a ticket exit sensor connected to the burster housing and positioned to sense, for each of the ticket drawers when the ticket burster is aligned with the ticket drawer, that one of the lottery tickets in the ticket drawer is positioned by the ticket movement assembly of the ticket drawer to exit the ticket drawer and enter the ticket inlet of the ticket burster, a barcode sensor connected to the burster housing and positioned to sense, for each of the ticket drawers when the ticket burster is aligned with the ticket drawer, a barcode on a back side of each lottery ticket from the ticket drawer that moves into the burster housing from the ticket drawer and a ticket drawer sensor connected to the burster housing and positioned to sense, for each of the ticket drawers when the ticket burster is aligned with the ticket drawer, the reflector of the ticket drawer.

2. The lottery ticket vending machine of claim 1, wherein, for each of the ticket drawers, the ticket pack sensor is configured to detect multiple packs of lottery tickets in that ticket drawer when the ticket burster is aligned with that ticket drawer.

3. The lottery ticket vending machine of claim 1, wherein the reflectors of all of the ticket drawers are the same.

4. The lottery ticket vending machine of claim 1, wherein the reflectors of all of the ticket drawers are different.

5. The lottery ticket vending machine of claim 4, wherein the reflector of each ticket drawer comprises a different pattern that can be sensed by the ticket drawer sensor.

6. The lottery ticket vending machine of claim 4, wherein the reflector of each ticket drawer comprises a different code that can be sensed by the ticket drawer sensor.

7. A lottery ticket vending machine comprising:

a housing;

a lottery ticket drawer supported by the housing, the ticket drawer comprising a ticket movement assembly;

a ticket burster supported by the housing, the ticket burster comprising a burster housing defining a ticket inlet and a ticket outlet positioned lower in the burster housing than the ticket inlet, the ticket burster comprising:

a ticket exit sensor connected to the burster housing and positioned to sense, when the ticket burster is aligned with the ticket drawer, that one of the lottery tickets in the ticket drawer is positioned by the ticket movement assembly to exit the ticket drawer and enter the ticket inlet of the ticket burster, a barcode sensor connected to the burster housing and positioned to sense, when the ticket burster is aligned with the ticket drawer, a barcode on a back side of each lottery ticket from the ticket drawer that moves into the burster housing from the ticket drawer, and a ticket drawer sensor connected to the burster housing and positioned to sense, when the ticket burster is aligned with the ticket drawer, a part of the ticket drawer; and a controller supported by the housing, the controller configured to receive data from the ticket exit sensor, the barcode sensor, and the ticket drawer sensor, the controller configured to, based on the data cause an action to be taken.

8. The lottery ticket vending machine of claim 7, wherein the action comprises sending a message to a remote device.

9. The lottery ticket vending machine of claim 7, wherein the action comprises causing a display by a display device of an indication.

10. The lottery ticket vending machine of claim 7, wherein the action comprises causing a display by a display device of an indication that the ticket drawer is in an incorrect position.

* * * * *